United States Patent
Fujita et al.

(10) Patent No.: US 7,664,160 B2
(45) Date of Patent: Feb. 16, 2010

(54) TRANSMITTING DEVICE, RECEIVING DEVICE, AND COMMUNICATION SYSTEM

(75) Inventors: Suguru Fujita, Tokyo (JP); Kazuaki Takahashi, Tokyo (JP); Masahiro Mimura, Tokyo (JP)

(73) Assignee: Panasonic Corporation, Osaka (JP)

( * ) Notice: Subject to any disclaimer, the term of this patent is extended or adjusted under 35 U.S.C. 154(b) by 590 days.

(21) Appl. No.: 10/580,540

(22) PCT Filed: Oct. 11, 2005

(86) PCT No.: PCT/JP2005/018670

§ 371 (c)(1),
(2), (4) Date: May 23, 2006

(87) PCT Pub. No.: WO2006/054405

PCT Pub. Date: May 26, 2006

(65) Prior Publication Data

US 2007/0110125 A1    May 17, 2007

(30) Foreign Application Priority Data

Nov. 19, 2004  (JP) .............................. 2004-335654
Sep. 28, 2005  (JP) .............................. 2005-281792

(51) Int. Cl.
  *H03B 1/00*  (2006.01)
  *H03K 7/04*  (2006.01)
(52) U.S. Cl. ........................ 375/130; 375/329
(58) Field of Classification Search ............... 375/130, 375/138, 146–147, 150, 285, 295, 351, 355, 375/239
See application file for complete search history.

(56) References Cited

U.S. PATENT DOCUMENTS

| | | | |
|---|---|---|---|
| 7,103,109 B2* | 9/2006 | Nakache et al. | 375/295 |
| 2001/0053175 A1* | 12/2001 | Hoctor et al. | 375/130 |
| 2003/0069025 A1 | 4/2003 | Hoctor et al. | |
| 2003/0099299 A1 | 5/2003 | Rogerson et al. | |
| 2003/0108133 A1* | 6/2003 | Richards | 375/351 |
| 2004/0202230 A1* | 10/2004 | Dowla et al. | 375/147 |
| 2004/0240523 A1* | 12/2004 | Mimura et al. | 375/130 |

FOREIGN PATENT DOCUMENTS

JP    2003-515974 A    5/2003

(Continued)

OTHER PUBLICATIONS

Japanese Search Report for PCT/JP2005/018670, dated Jan. 17, 2006.

(Continued)

*Primary Examiner*—Khanh C Tran
(74) *Attorney, Agent, or Firm*—RatnerPrestia

(57) ABSTRACT

A transmitting device includes a continuous pulse generating unit, modulating unit, and output unit. The continuous pulse generating unit continuously generates multiple impulse waveforms at arbitrary time intervals but shorter than the pulse string repetition cycle. The modulating unit modulates continuous pulses generated by the continuous pulse generating unit, using transmission data. The output unit outputs a modulated pulse modulated by the modulating unit. The receiving device includes a modulated pulse receiving unit that receives a modulated pulse transmitted from the above-mentioned transmitting device; and a demodulating unit that receives transmission data by demodulating a modulated pulse received by the modulated pulse receiving unit.

9 Claims, 26 Drawing Sheets

FOREIGN PATENT DOCUMENTS

| | | |
|---|---|---|
| JP | 2003-189353 A | 7/2003 |
| WO | WO 01/39451 A1 | 5/2001 |
| WO | WO 2004/077775 A1 | 9/2004 |

OTHER PUBLICATIONS

English translation of Form PCT/ISA/210.

Choi, et al., "Performance of Autocorrelation Receivers for Ultra-Wideband Communications with PPM in Multipath Channels", In: Ultra Wideband Systems and Technologies, 2002, Digest of Papers, 2002 IEEE Conference, May 23, 2002, pp. 213-217.

Quek, et al., "Ultrawide Bandwidth Transmitted-Reference Signaling", Communications, 2004 IEEE International Conference, Jun. 24, 2004, pp. 3409-3413, vol. 6.

European Search Report for corresponding European Application No. EP 05 79 3701 dated May 18, 2007.

* cited by examiner

TRANSMITTING DEVICE, RECEIVING DEVICE, AND COMMUNICATION SYSTEM

This application is a U.S. National Phase Application of PCT International Application No. PCT/JP2005/018670.

TECHNICAL FIELD

The present invention relates to a transmitting device, receiving device, and communication system employing these devices, in pulse radio mainly using a microwave or milliwave.

BACKGROUND ART

In pulse communication method, its frequency spectrum requires an extremely wide frequency band when rectangular pulses are used. The frequency band is expressed by 1/T [GHz] with the pulse width being T [ns]. Pulses with width T made of a sine wave with frequency f have secondary spectrums at intervals of 1/T centering around a spectrum with center frequency f and band width 2/T.

In order to avoid interference with other communication devices and to allocate frequency channels in a system, the band for the primary spectrum needs to be limited as well as for secondary spectrums. For a measure against these problems, the makeup disclosed in Japanese translation of PCT publication No. 2003-515974, for example, is known as a method used for a conventional pulse communication apparatus and system. FIG. 30 illustrates the makeup of a transmitting device in a conventional, pulse-using, ultrawideband (UWB) data transmission system, described in publication No. 2003-515974.

In FIG. 30, low-level impulse generator 4000 excites an optional, band-pass or pulse-forming filter 4002, by means of low-level impulses. Low-level impulse generator 4000 is composed of an arbitrary number of devices including a low-voltage step recovery diode (SRD), Zener diode, avalanche transistor, breakover device, and thyristor. Mixer 4008 actually works as a high-speed switch for adjusting the amplitude of signal output from oscillator 4006 according to impulse excitement from low-level impulse generator 4000.

The pulse envelope thus obtained retains the original time-domain shape in the impulse excitation. When filter 4002 is utilized, mixer 4008 actions so as to heterodyne (i.e. frequency-convert) a band-pass filtered or pulse shaped, low-level impulse signal, to a desired central operating frequency.

Next, the band width of a UWB signal in output from mixer 4008 is determined by that of band-pass or pulse-forming filter 4002. This method allows low-level impulse generator 4000 to actuate at a lower frequency, with the wide-band energy being shifted by a desired frequency.

The above-mentioned makeup aims at a pulse waveform for implementing a desired spectrum.

The conventional makeup, however, requires appropriately changing its characteristic in one-several tenths of 1 ns to implement a pulse shaper for shaping an extremely short impulse waveform, with a pulse width of 1 ns or shorter, for example, by means of a digital circuit. This may have been difficult to implement with the current IC manufacturing technology. With an analog circuit, a characteristic in the wide band from a direct current (DC) to several tens of gigahertz needs to be implemented with high reproducibility. With an analog circuit, the size of which is determined by the wavelength of the frequency component included in a signal, it may have been difficult to stably implement a miniature pulse shaper.

SUMMARY OF THE INVENTION

The present invention provides a small-sized and inexpensive transmitting device, receiving device, and communication system, with a stable characteristic for generating a pulse waveform and using pulses with superior mass productivity.

A transmitting device according to the present invention includes a continuous pulse generating unit, modulating unit, and output unit. The continuous pulse generating unit continuously generates multiple impulse waveforms at arbitrary time intervals but shorter than the pulse string repetition cycle. The modulating unit modulates continuous pulses that are generated by the continuous pulse generating unit, using transmission data. The output unit outputs pulses modulated by the modulating unit. This makeup allows the frequency band of the frequency spectrum to be arbitrarily changed by using multiple impulse waveforms being continuously generated at arbitrary time intervals, as a transmission signal. Further, a null point can be provided in the band. These characteristics enable implementing communications with limited influence on other systems.

A transmitting device according to the present invention may be one capable of setting to arbitrary time the pulse width of multiple impulse waveforms generated by the continuous pulse generating unit. This makeup allows the frequency band of the frequency spectrum to be arbitrarily changed and a null point to be provided in the band. These characteristics enable implementing communications with limited influence on other systems.

A transmitting device according to the present invention may be one that has one kind of pulse width to be set by the continuous pulse generating unit. This makeup enables the number of component types to be reduced owing to one kind of pulse width.

A transmitting device according to the present invention may be one that has at least two kinds of pulse width with different times, to be set by the continuous pulse generating unit. This makeup enables the frequency of a null point in the band to be variable, making adjustment of the null point position easier with more kinds of pulse width.

A transmitting device according to the present invention may be one capable of setting to arbitrary time the pulse interval of multiple impulse waveforms generated by the continuous pulse generating unit. This makeup allows the frequency band of the frequency spectrum to be arbitrarily changed and a null point to be provided in the band. These characteristics enable implementing communications with limited influence on other systems.

A transmitting device according to the present invention may be one that has one kind of pulse interval to be set by the continuous pulse generating unit. This makeup enables the number of component types to be reduced owing to one kind of pulse interval.

A transmitting device according to the present invention may be one in which the continuous pulse generating unit sets the pulse interval and pulse width equally. This makeup enables the number of component types to be reduced owing to one kind of width and interval of pulses to be generated.

A transmitting device according to the present invention may be one in which the pulse interval of multiple impulse waveforms generated by the continuous pulse generating unit is set shorter than the pulse width of the same. This makeup allows the frequency band of the frequency spectrum to be arbitrarily changed. Further, as a result that the pulse interval can be reduced, the same frequency spectrum can be implemented equivalently to a case where the pulse width is reduced timewise.

A transmitting device according to the present invention may be one in which the continuous pulse generating unit sets at least two different pulse intervals. This makeup allows the frequency of a null point in the band to be variable.

A transmitting device according to the present invention may be one in which the continuous pulse generating unit has at least one of rising and falling delays in the impulse waveform generated. This makeup enables suppressing the components other than the desired principal frequency spectrum.

A transmitting device according to the present invention further includes a frequency converting unit for converting the frequency of pulses modulated by the modulating unit, where the frequency to be converted is arbitrarily selectable. The output unit may output modulated pulses after converted by the frequency converting unit. This makeup further allows the frequency band of the frequency spectrum to be arbitrarily changed and a null point to be provided in the band.

A transmitting device according to the present invention further includes a frequency converting unit for converting the frequency of continuous pulses generated by the continuous pulse generating unit, where the frequency to be converted is arbitrarily selectable. The modulating unit may modulate continuous pulses after converted by the frequency converting unit. This makeup further allows the frequency band of the frequency spectrum to be arbitrarily changed and a null point to be provided in the band.

A transmitting device according to the present invention may be one that has one kind of frequency of an impulse waveform generated by the continuous pulse generating unit. This makeup enables the circuitry to be simple.

A transmitting device according to the present invention may be one that has at least two kinds of frequencies of an impulse waveform generated by the continuous pulse generating unit. This makeup allows the frequency band of the frequency spectrum to be arbitrarily changed and a null point to be provided in the band.

A transmitting device according to the present invention may be one in which the power level of an impulse waveform generated by the continuous pulse generating unit can be arbitrarily set. This makeup allows the frequency band of the frequency spectrum to be arbitrarily changed and a null point to be provided in the band.

A transmitting device according to the present invention may be one that has one kind of power level of an impulse waveform generated by the continuous pulse generating unit. This makeup enables the circuitry to be simple.

A transmitting device according to the present invention may be one that has at least two kinds of power levels of an impulse waveform generated by the continuous pulse generating unit. This makeup allows the frequency band of the frequency spectrum to be arbitrarily changed and a null point to be provided in the band.

A transmitting device according to the present invention may be one in which the modulation method of the modulating unit is pulse-position modulation with grouping multiple continuous impulse waveforms. This makeup enables data signal communications by means of the modulated pulse position.

A transmitting device according to the present invention may be one in which the modulation method of the modulating unit is pulse-phase modulation with grouping multiple continuous impulse waveforms. This makeup enables data signal communications by means of the modulated pulse phase.

A transmitting device according to the present invention may be one in which pulse-phase modulation is applied only to the second pulse or later. This makeup allows sensitive demodulation because it is adequate as long as comparison is made for the phase of the first pulse in demodulation.

A transmitting device according to the present invention may be one in which pulse-phase modulation is applied to every pulse. This makeup allows increasing information volume in communications with multivaluing owing to more pulses for carrying information than in other makeup.

A transmitting device according to the present invention may be one in which the modulation method of the modulating unit is pulse-amplitude modulation with grouping multiple continuous impulse waveforms. This makeup enables data signal communications by means of the modulated pulse amplitude.

A transmitting device according to the present invention may be one in which pulse-amplitude modulation is applied only to the second pulse or later. This makeup allows sensitive demodulation because it is adequate as long as comparison is made for the amplitude of the first pulse in demodulation.

A transmitting device according to the present invention may be one in which pulse-amplitude modulation is applied to every pulse. This makeup allows increasing information volume in communications with multivaluing owing to more pulses for carrying information than in other makeup.

A transmitting device according to the present invention may be one in which pulse-position modulation is applied only to the second pulse or later. This makeup allows sensitive demodulation because it is adequate as long as comparison is made for the position of the first pulse in demodulation.

A transmitting device according to the present invention may be one in which pulse-position modulation is applied to every pulse. This makeup allows increasing information volume in communications with multivaluing owing to more pulses for carrying information than in other makeup.

A transmitting device according to the present invention may be one in which the continuous pulse generating unit outputs multiple impulse waveforms only for a specific transmission data signal. This makeup enables generating a signal having a desired frequency spectrum by means of correlation of multiple impulse waveforms.

A receiving device according to the present invention includes a modulated pulse receiving unit for receiving modulated pulses transmitted from a transmitting device; and a demodulating unit for receiving transmission data by demodulating modulated pulses received by the modulated pulse receiving unit. This makeup allows receiving transmission data by receiving and demodulating a signal transmitted using continuous pulses that are multiple impulse waveforms continuously generated at arbitrary time intervals.

A receiving device according to the present invention includes a modulated pulse receiving unit; and a demodulating unit. The modulated pulse receiving unit receives modulated pulses modulated using transmission data and transmitted, where the modulated pulses are multiple impulse waveforms continuously generated by the transmitting device at arbitrary time intervals but shorter than the pulse string repetition cycle. The demodulating unit receives transmission data by demodulating modulated pulses received by the modulated pulse receiving unit. The demodulating unit may be one that further demodulates a pulse-phase modulated signal with grouping multiple continuous impulse waveforms, and judges the change in phase of the second pulse or later with reference to the first one for demodulating. This makeup enables preparing a precise reference signal, thus receiving a data signal precisely.

A demodulating unit of a receiving device according to the present invention may be one that demodulates a pulse-amplitude modulated signal with grouping multiple continuous impulse waveforms, and determines the size in amplitude of the second pulse or later with reference to the first one for demodulating. This makeup allows preparing a precise reference signal, thus receiving a data signal precisely.

A demodulating unit of a receiving device according to the present invention may be one that demodulates a pulse-position modulated signal with grouping multiple continuous impulse waveforms, and determines the change in position of the second pulse or later with reference to the first one for demodulating. This makeup allows preparing a precise reference signal, thus receiving a data signal precisely.

A transmitting device according to the present invention further includes a single pulse transmitting unit that generates single pulses, pulse-position modulates the pulses using transmission data, and outputs them. The continuous pulses generated by the continuous pulse generating unit are those with different phases continued. The modulating unit may be one that does not modulate continuous pulses generated by the continuous pulse generating unit but inputs them to the output unit. This makeup implements communications with precise reception judgement as a result of sending two pairs of pulses with different phases as a synchronous signal aside from the data signal.

A transmitting device according to the present invention may be one in which both a pulse-position modulated signal supplied from the single pulse transmitting unit and continuous pulses are changed in position as appropriate for the same arbitrary time. This makeup allows continuously outputting multiple impulse waveforms at arbitrary time intervals but shorter than the pulse repetition frequency for a specific data string. Consequently, a signal having a desired frequency spectrum can be generated by means of correlation of multiple impulse waveforms.

A receiving device according to the present invention may be one that includes a two-signal receiving unit and a correlation judgment unit. The two-signal receiving unit receives a pulse-position modulated signal supplied from the single pulse transmitting unit and a continuous pulses. The correlation judgment unit may judge information by multiplying two signals received by the two-signal receiving unit to convert the correlation signal to signals with different phases, positive and negative, according to the pulse position. This makeup implements precise reception judgement by means of a synchronous signal composed of two pairs of pulses with different phases transmitted from the transmitting device aside from a data signal.

Figure 1:
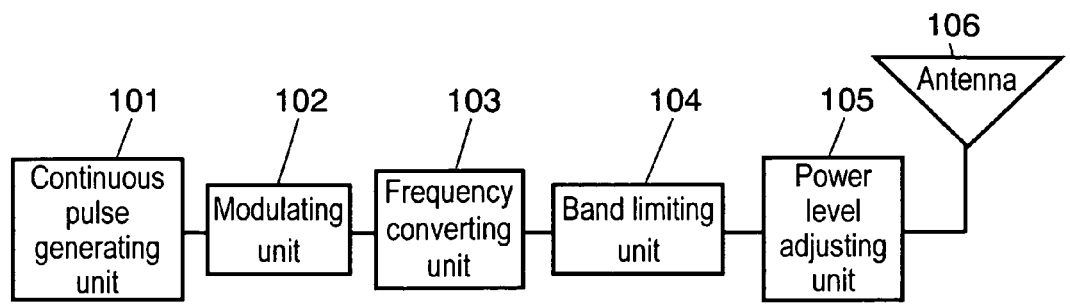
FIG. 1 is a block diagram illustrating the makeup of a transmitting device according to the first exemplary embodiment of the present invention.

REFERENCE MARKS IN THE DRAWINGS 101, 1405 Continuous pulse generating unit
102, 1420 Modulating unit
103, 901a, 901b, 901c, 1406, 2003, 2101, 2201, 2301, 2401, 2501 Frequency converting unit
104, 2002 Band limiting unit
105 Power level adjusting unit (Output unit)
106, 2001 Antenna
201, 1407 Rectangular wave generating unit
202, 1408 First delay unit
203, 205, 1409, 1411 AND unit
204, 1410 Second delay unit
206 OR unit
301 Third delay unit
401, 501 Switching unit
402, 2302, 2403 Delay unit
403, 503, 1414 Synthesizing unit
502 Inverting unit
601 Attenuator
701 Variable attenuator
801 Signal converting unit
802a, 802b Variable attenuator
902, 1101, 1412, 1413 Oscillator
903 Mixer
904 Continuous pulse signal input terminal
905 Continuous pulse cosine waveform signal output terminal Switch
1201, 1203, 1301, 1303, 1401, 1403, 1501, 1503, 1601, 1603, 1701, 1703, 1801, 1803, 1901, 1903 Continuous pulse cosine waveform signal
1202, 1204, 1302, 1304, 1402, 1404, 1502, 1504, 1602, 1604, 1702, 1704, 1802, 1804, 1902, 1904 Single pulse cosine waveform signal
1415 Cosine waveform signal output terminal
1421 First modulator
1422 Second modulator
2004 Demodulating unit
2102, 2202, 2402, 2502 Received signal input terminal
2103 Detecting unit
2104, 2505 LPF
2105, 2206, 2405, 2506 Output terminal for frequency-converted received signal
2203 Generator of continuous pulse cosine waveform signal for correlation
2204, 2504 Correlator
2205 Correlation judgment unit
2404 Comparator
2503 Correlation signal input terminal
3101 Home server
3102 Television set (TV)
3103, 3104 Personal computer (PC)
3201 First mobile object
3202 Second mobile object
3203 Distance-measuring area
3210 Receiving antenna
3211 Received high-frequency unit
3212 Flying time calculating unit
3213, 3215 Transmitted pulse waveform
3214, 3216 Received pulse waveform
3301 Data arrangement judge
3302 Pulse-position modulator

DETAILED DESCRIPTION OF PREFERRED EMBODIMENTS

Hereinafter, a description is made for some exemplary embodiments of the present invention with reference to the related drawings.

First Exemplary Embodiment

FIG. 1 is a block diagram illustrating the makeup of a transmitting device according to the first exemplary embodiment of the present invention.

In FIG. 1, the transmitting device is a communication apparatus using pulses, equipped with continuous pulse generating unit 101, modulating unit 102, frequency converting unit 103, band limiting unit 104, power level adjusting unit 105, and antenna 106. Continuous pulse generating unit 101 generates continuous pulses. Modulating unit 102 modulates continuous pulses generated by continuous pulse generating unit 101. Frequency converting unit 103 converts the frequency of continuous pulses modulated by modulating unit 102. Band limiting unit 104 limits the band of a signal frequency-converted by frequency converting unit 103. Power level adjusting unit 105 is an output unit that adjusts the power level of a signal with its band limited by band limiting unit 104, and outputs the power level. Antenna 106 radiates output from power level adjusting unit 105.

Continuous pulse generating unit 101 generates a continuous pulse signal with a single pulse and at least another one continued, at time intervals shorter than the repetition cycle of the single pulse. The respective widths and intervals of continuous pulses are later described in detail. Modulating unit 102 enables a communication target device to transmit information by providing a continuous pulse signal with information.

Frequency converting unit 103 frequency-converts a continuous pulse signal modulated to a continuous pulse cosine waveform signal, which is a signal in a working frequency band in which a communication apparatus can perform wireless communications. A continuous pulse cosine waveform signal, after it is band-limited by band limiting unit 104 and then its transmission power level is adjusted by power level adjusting unit 105, is transmitted from antenna 106.

Subsequently, a description is made for concrete examples of the makeup for each function.

Figure 2:
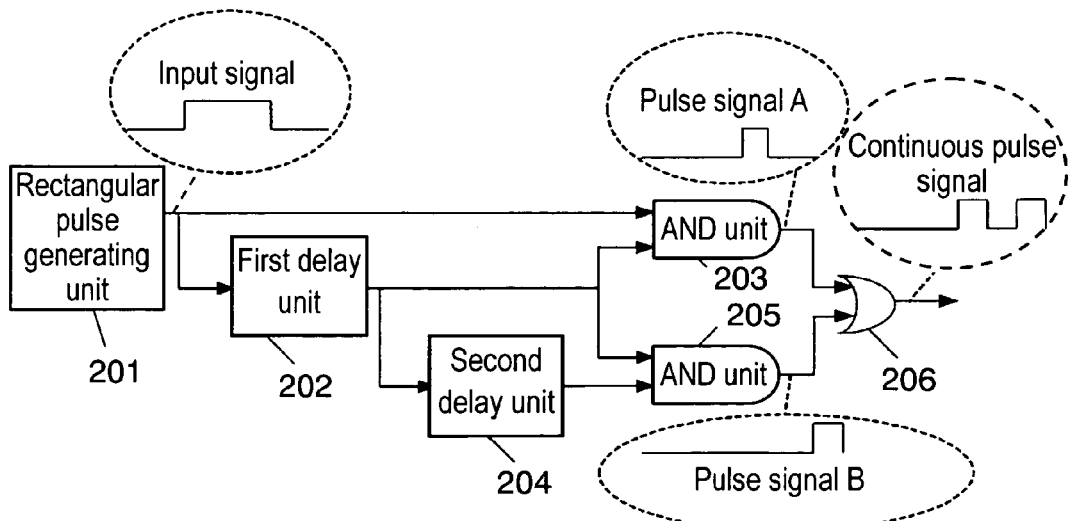
FIG. 2 is a block diagram illustrating the makeup of a continuous pulse generating unit in the transmitting device according to the embodiment.

FIG. 2 is a block diagram illustrating the makeup of a continuous pulse generating unit according to the embodiment. A continuous rectangular wave generated by rectangular wave generating unit 201 is bifurcated, and one of them is delayed by first delay unit 202 by arbitrary time, to be fed into AND unit 203. Further, output from first delay unit 202 is delayed by second delay unit 204, to be fed into AND unit 205. As a result that output from AND units 203 and 205 is fed into OR unit 206, a continuous pulse signal in which two pulses continue is generated as the output. Here, the widths and intervals of respective pulses in the continuous pulse signal are arbitrarily adjustable by changing the delay times of first delay unit 202 and second delay unit 204.

Figure 3:
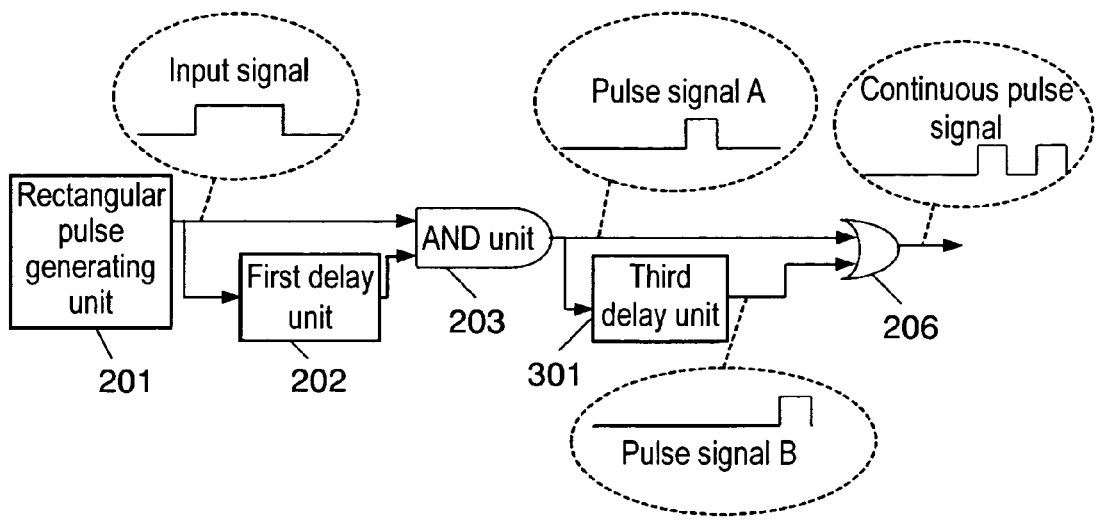
FIG. 3 is a block diagram illustrating the makeup of a continuous pulse generating unit in the transmitting device according to the embodiment.

FIG. 3 is a block diagram illustrating the makeup, different from that in FIG. 2, of the continuous pulse generating unit according to the embodiment.

The continuous pulse generating unit shown in FIG. 3 is different from that in FIG. 2 in that the unit has a small number of logical circuits owing to changing the positions of delay circuits and logical circuits. In FIG. 3, a continuous rectangular wave generated by rectangular wave generating unit 201 is bifurcated, and one of them is delayed by first delay unit 202 by arbitrary time, to be fed into AND unit 203. Further, output from AND unit 203 is bifurcated, and one of them is delayed by third delay unit 301 by arbitrary time, to be fed into OR unit 206. As a result, a continuous pulse signal in which two pulses continue is generated as the output. Here, the widths and intervals of respective pulses in the continuous pulse signal are arbitrarily adjustable by changing the delay times of first delay unit 202 and third delay unit 301.

Figure 4A:
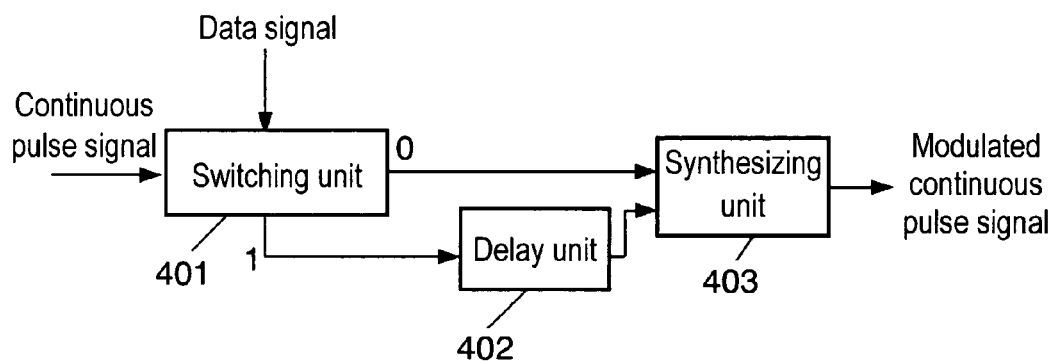
FIG. 4A is a block diagram illustrating the makeup of a modulating unit in the transmitting device according to the embodiment.

FIG. 4A is a block diagram illustrating the makeup of a modulating unit according to the embodiment. The modulation method of modulating unit 102 is pulse-position modulation (PPM). Although a description is made for a binary case to be easily understood, four or more values, by increasing the positions of pulses to be changed, are feasible in the same way. In FIG. 4A, a continuous pulse signal supplied from continuous pulse generating unit 101 is switched to two terminals by switching unit 401 according to a data signal separately fed and then is output.

Figure 4B:
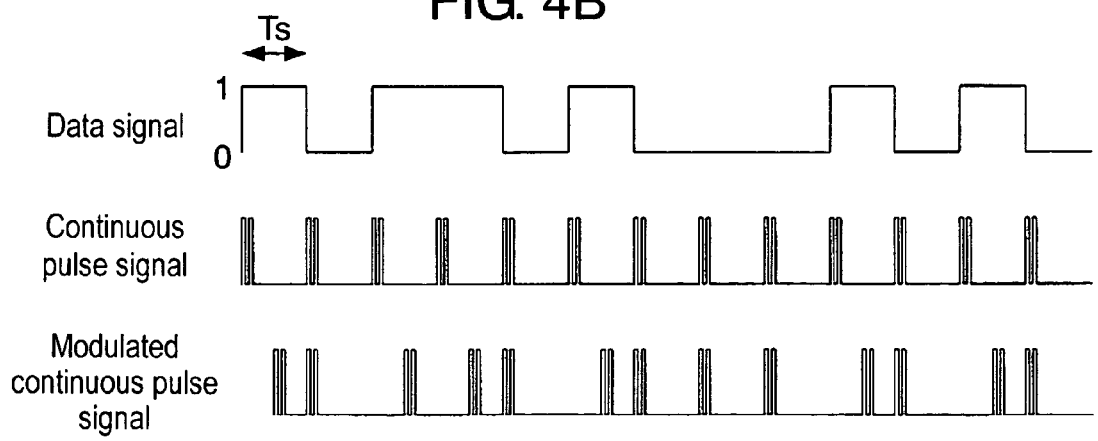
FIG. 4B is a conceptual diagram illustrating time relationship of each signal in the modulating unit of the transmitting device according to the embodiment.

If the value of data signal is "0", it is fed into synthesizing unit 403 as is, and if "1", after delayed by delay unit 402 by appropriate time, it is fed into synthesizing unit 403, as shown by the arrows. FIG. 4B is a conceptual diagram illustrating time relationship of each signal in modulating unit 102 according to the embodiment. Here, illustration is made for a case of the delay time of delay unit 402 being half of one symbol time Ts of the data signal.

Figure 5A:
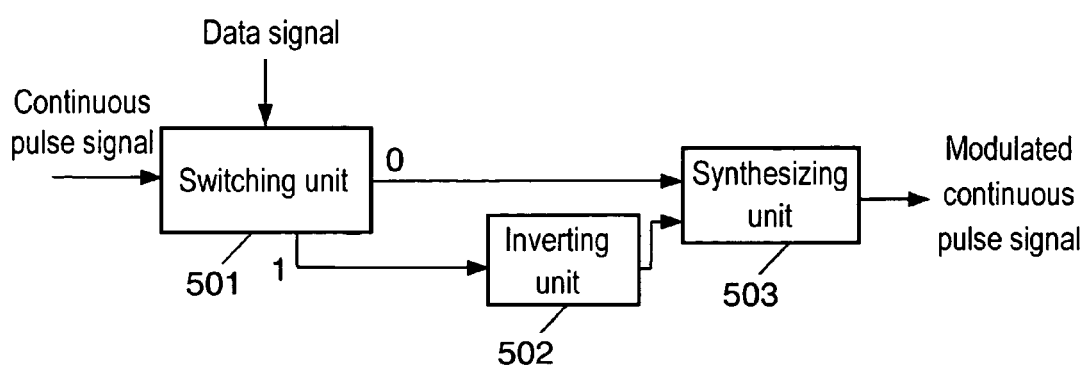
FIG. 5A is a block diagram illustrating the makeup of a modulating unit in the transmitting device according to the embodiment.
Figure 5B:
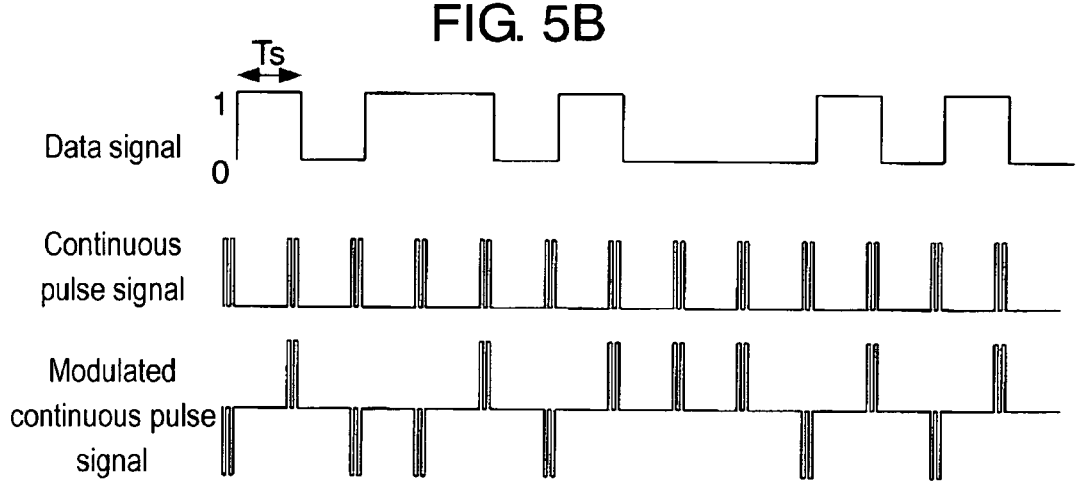
FIG. 5B is a conceptual diagram illustrating time relationship of each signal in the modulating unit of the transmitting device according to the embodiment.

In FIGS. 4A and 4B, the description is made for a case of the modulation method of modulating unit 102 being PPM. However, as shown in FIG. 5A, switching unit 501 switches a continuous pulse signal according to a data signal, and synthesizing unit 503 synthesizes a signal from switching unit 501, inverted by inverting unit 502, and a signal from switching unit 501. As shown in FIG. 5B, for biphase modulation (referred to as "biphase", hereinafter), in which information is added to the pulse phase, the present invention is feasible in the same way.

Figure 6A:
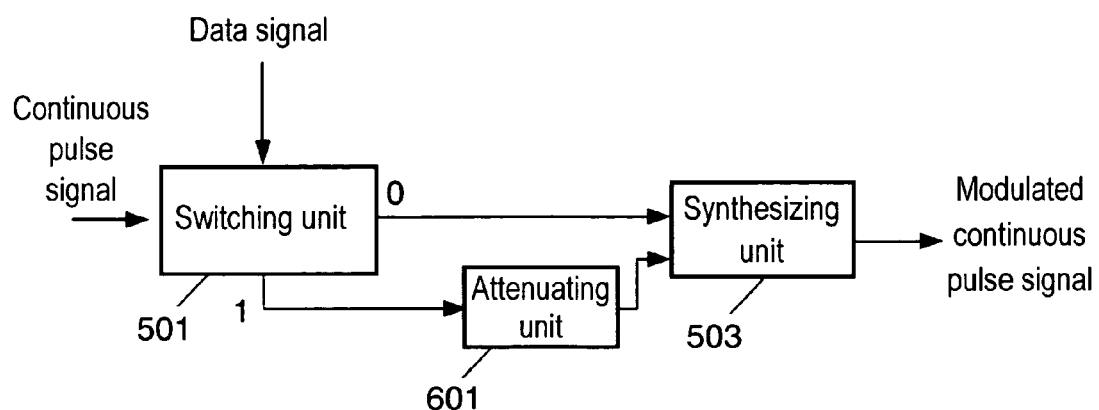
FIG. 6A is a block diagram illustrating the makeup of a modulating unit in the transmitting device according to the embodiment.
Figure 6B:
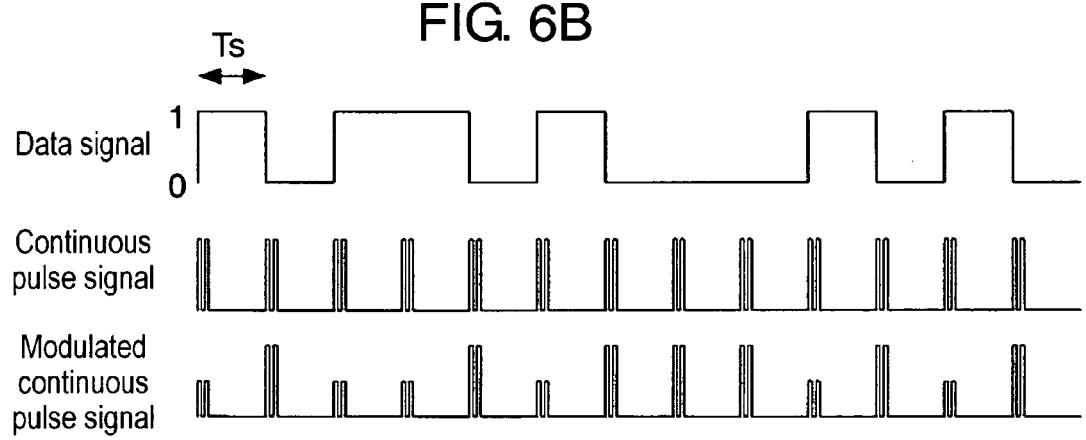
FIG. 6B is a conceptual diagram illustrating time relationship of each signal in the modulating unit of the transmitting device according to the embodiment.
Figure 7A:
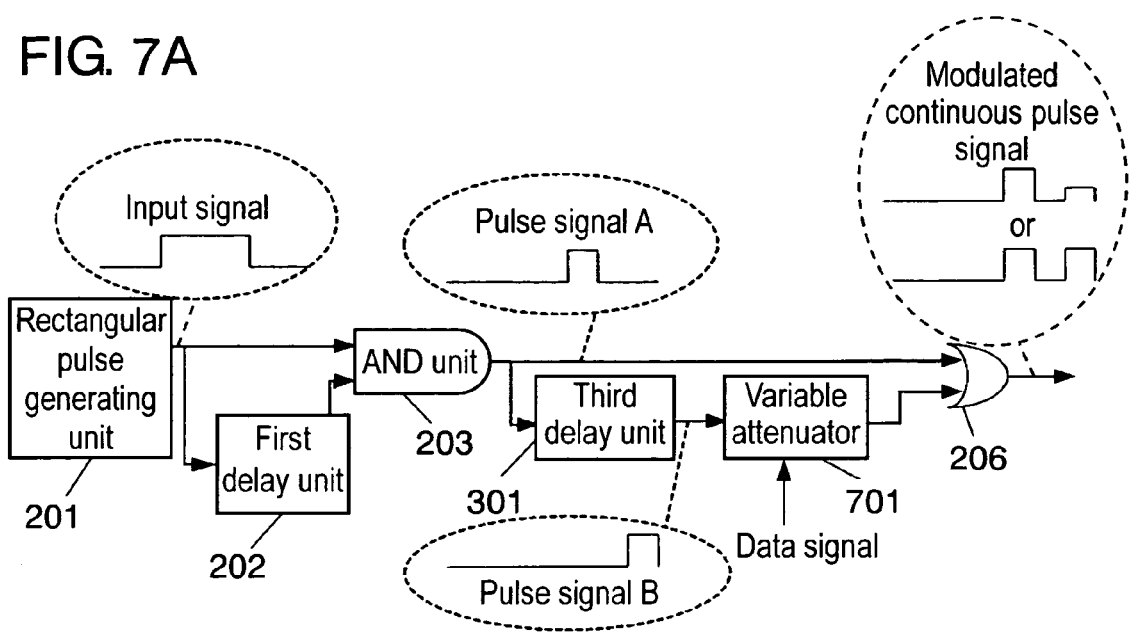
FIG. 7A is a block diagram illustrating the makeup of a continuous pulse generating unit and a modulating unit, being integrated, of the transmitting device according to the embodiment.
Figure 7B:
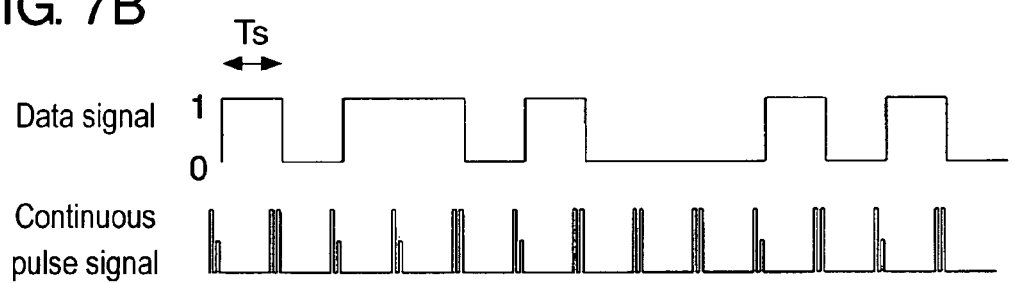
FIG. 7B is a conceptual diagram illustrating time relationship of each signal in the continuous pulse generating unit and the modulating unit, being integrated, of the transmitting device according to the embodiment.
Figure 8A:
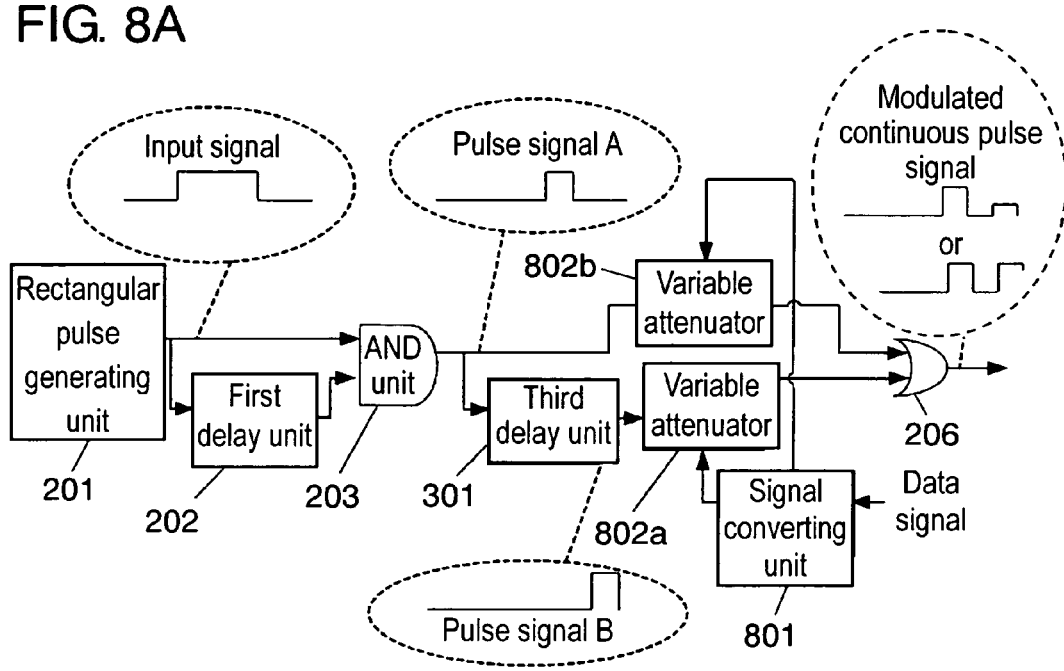
FIG. 8A is a block diagram illustrating the makeup of a continuous pulse generating unit and a modulating unit, being integrated, of the transmitting device according to the embodiment.
Figure 8B:
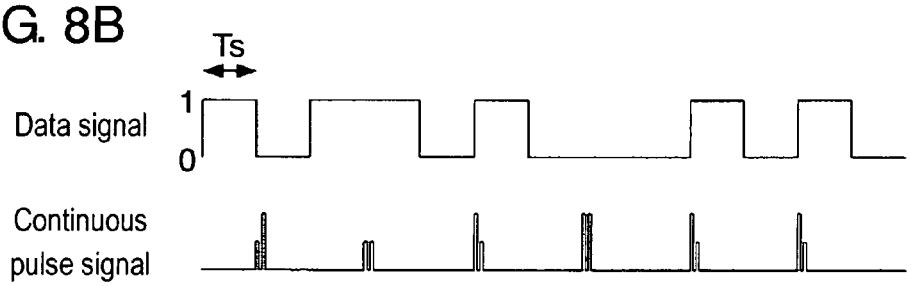
FIG. 8B is a conceptual diagram illustrating time relationship of each signal in the continuous pulse generating unit and the modulating unit, being integrated, of the transmitting device according to the embodiment.

Meanwhile, for pulse-amplitude modulation (PAM), in which the amplitude of a signal is changed by using attenuator 601, as shown in FIG. 6A, and information is added to the pulse amplitude, as shown in FIG. 6B, the present invention is feasible in the same way. The PAM here may be one in which, as shown in FIG. 7A, continuous pulse generating unit 101 is integrated with modulating unit 102, and an AM function by means of variable attenuator 701 is incorporated in the continuous pulse generating process to amplitude-modulate only one pulse signal out of continuous pulse signals shown in FIG. 7B. Further, the present invention is feasible in the same way in a case where as shown in FIG. 8A, after converting data signal by signal converting unit 801, different amplitude modulations are performed for both continuous pulse signals as shown in FIG. 8B using variable attenuators 802a and 802b.

Figure 9:
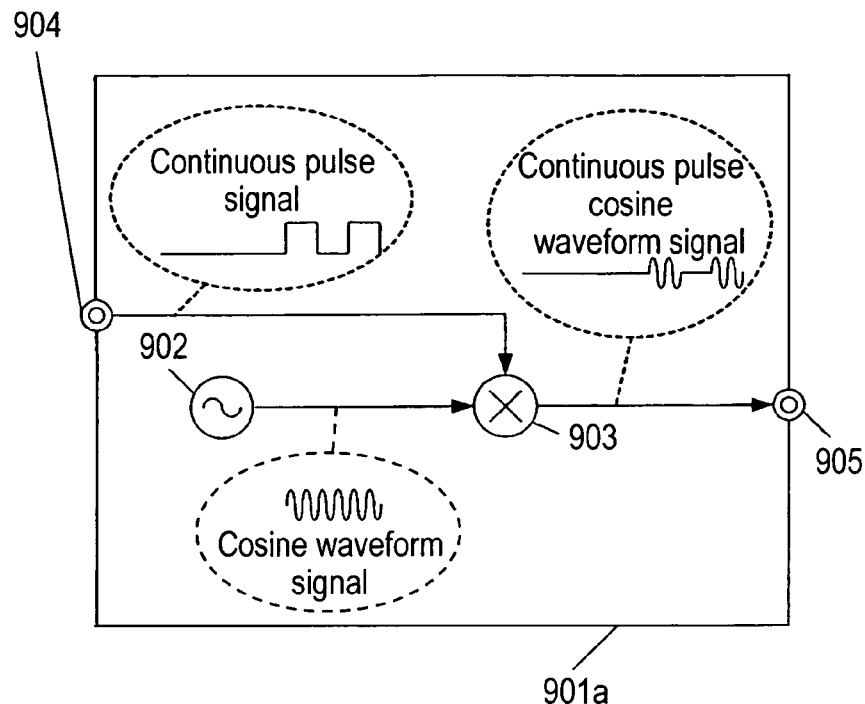
FIG. 9 is a block diagram illustrating the makeup of a frequency converting unit in the transmitting device according to the embodiment.

FIG. 9 is a block diagram illustrating the makeup of a frequency converting unit according to the embodiment. In FIG. 9, frequency converting unit 901a is composed of oscillator 902 and mixer 903, for example. Mixer 903 generates a continuous pulse cosine waveform signal by multiplying a continuous pulse signal fed from continuous pulse signal input terminal 904, by a cosine waveform signal supplied from oscillator 902, and outputs the signal from continuous pulse cosine waveform signal output terminal 905.

Figure 10:
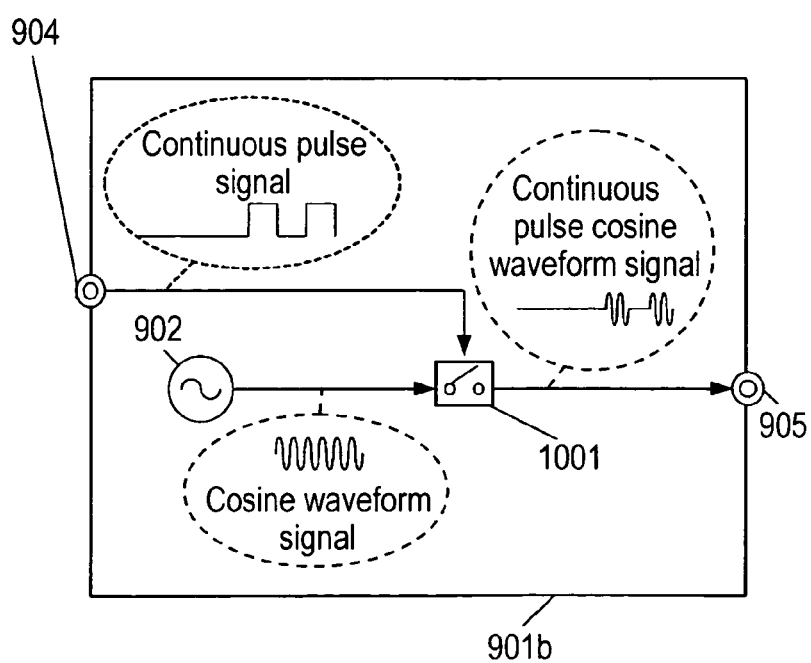
FIG. 10 is a block diagram illustrating the makeup of a frequency converting unit in the transmitting device according to the embodiment.

FIG. 10 is a block diagram illustrating the makeup, different from that in FIG. 9, of a frequency converting unit according to the embodiment. FIG. 10 is different from FIG. 9 in that switch 1001 is used instead of mixer 903. In FIG. 10, frequency converting unit 901b, composed of oscillator 902 and switch 1001, generates a continuous pulse cosine waveform signal by turning on/off switch 1001 by means of a continuous pulse signal.

Figure 11:
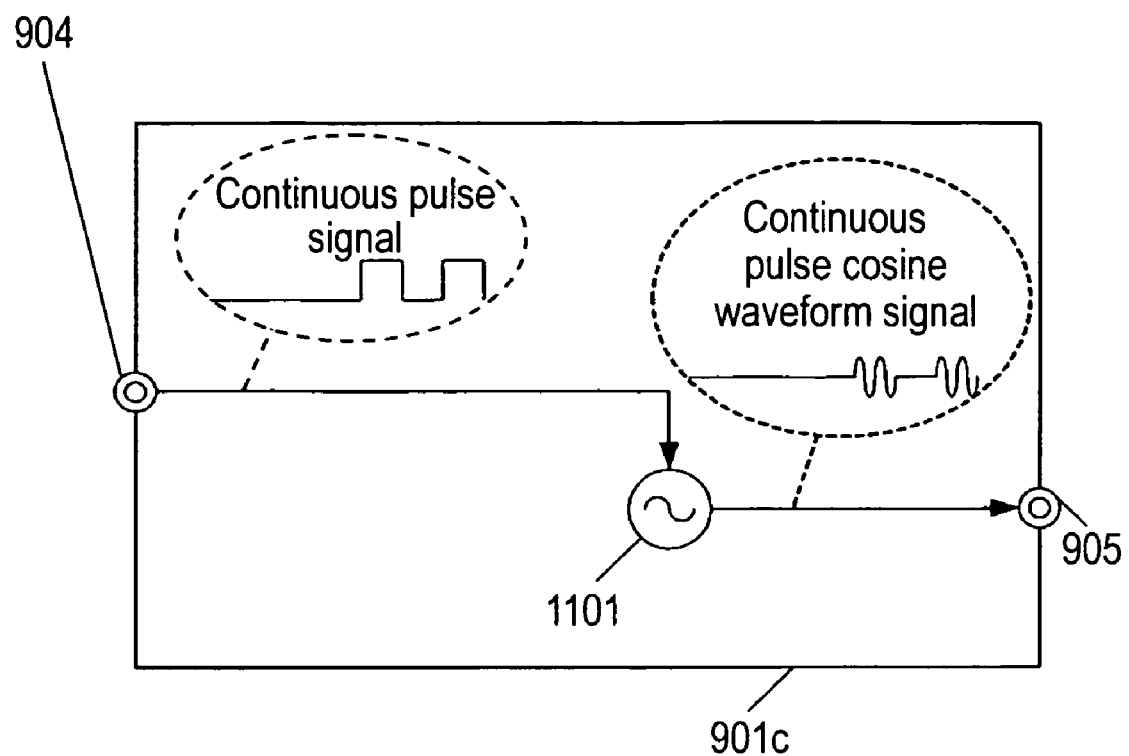
FIG. 11 is a block diagram illustrating the makeup of a frequency converting unit in the transmitting device according to the embodiment.

FIG. 11 is a block diagram illustrating a frequency converting unit, different from those in FIGS. 9 and 10. The makeup in FIG. 11 is different from those in FIGS. 9 and 10 in that an oscillation action of oscillator 1101 is directly turned on/off without using mixer 903 or switch 1001. Frequency converting unit 901c is composed of only oscillator 1101 that can intermittently start/stop an oscillation action. A continuous pulse cosine waveform signal is generated by starting/stopping an oscillation action of oscillator 1101 with a continuous pulse signal as a control signal.

The following describe a characteristic of a continuous pulse cosine waveform.

Figure 12A:
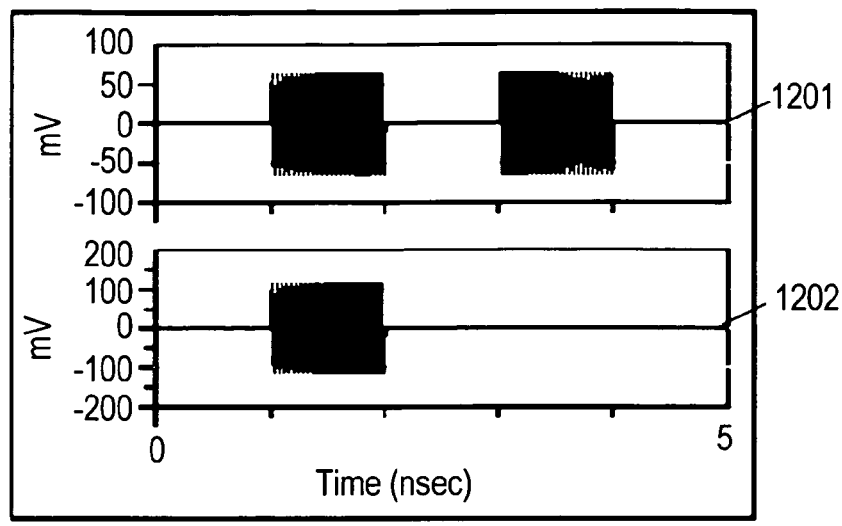
FIG. 12A illustrates the pulse waveform time-base characteristic of a continuous pulse cosine waveform signal in the transmitting device according to the embodiment and a conventional single pulse cosine waveform signal.
Figure 12B:
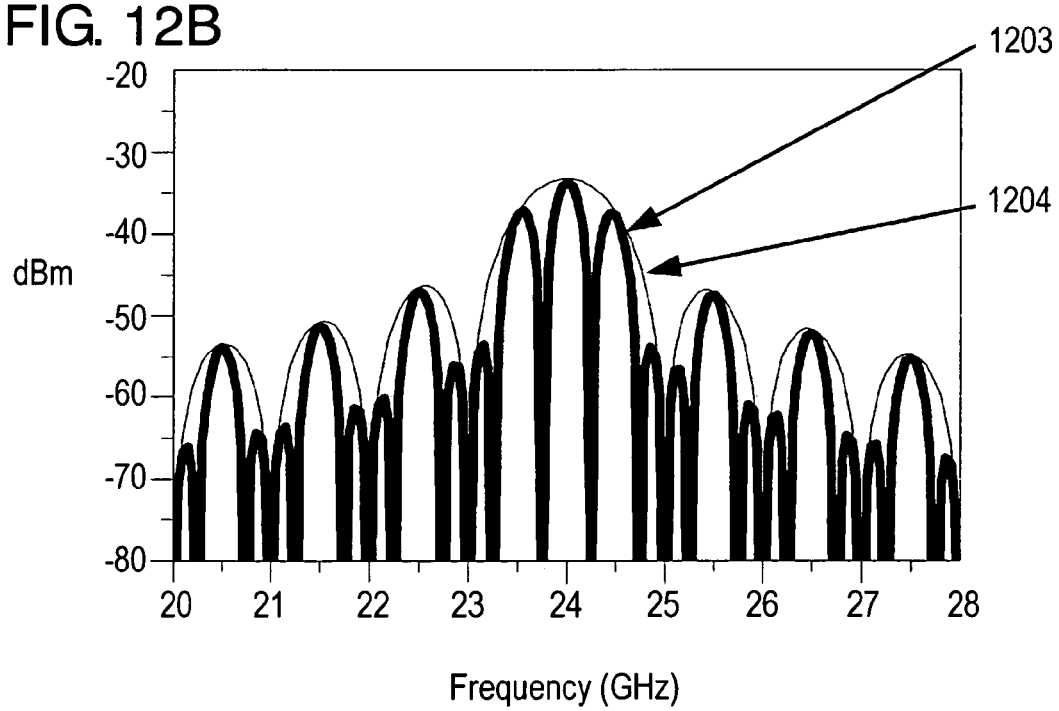
FIG. 12B illustrates the pulse waveform frequency-base characteristic of the same.

FIG. 12A is a waveform chart illustrating the pulse waveform time-base characteristic of a continuous pulse cosine waveform signal in the transmitting device according to the embodiment, and a conventional single pulse cosine waveform signal. FIG. 12B illustrates the pulse waveform frequency-base characteristics of the same. Both continuous pulse cosine waveform signal 1201 and single pulse cosine waveform signal 1202 are composed of a 24-GHz cosine waveform signal, with the pulse width of a single pulse being 1 ns. Continuous pulse cosine waveform signal 1201 indicates an example of two pulses continued, with a pulse interval of 1 ns.

The frequency spectrum of single pulse cosine waveform signal 1204 spreads over a band of an approximately 2-GHz width with a center frequency of 24 GHz. Meanwhile, the frequency spectrum of continuous pulse cosine waveform signal 1203 has the same center frequency of 24 GHz, but a band width of approximately 0.5 GHz, reduced to ¼. The band widths in which the power level ranges from its maximum level to 10 dB and 20 dB lower than the maximum are 1.6 GHz (described as "1.6 GHz@10 dB", hereinafter) and 1.8 GHz (described as "1.8 GHz@20 dB", hereinafter), respectively, for single pulse cosine waveform signal 1204. Meanwhile, the values are 1.2 GHz@10 dB and 1.4 GHz@20 dB for continuous pulse cosine waveform signal 1203, allowing the used band width to be reduced by 0.4 GHz.

Figure 13A:
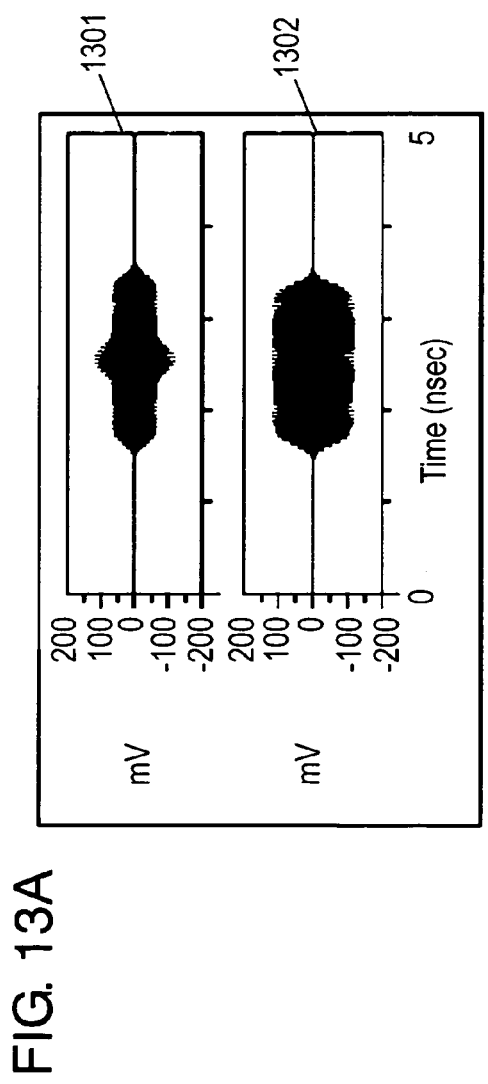
FIG. 13A illustrates the pulse waveform time-base characteristic of a continuous pulse cosine waveform signal in the transmitting device according to the embodiment and a conventional single pulse cosine waveform signal.
Figure 13B:
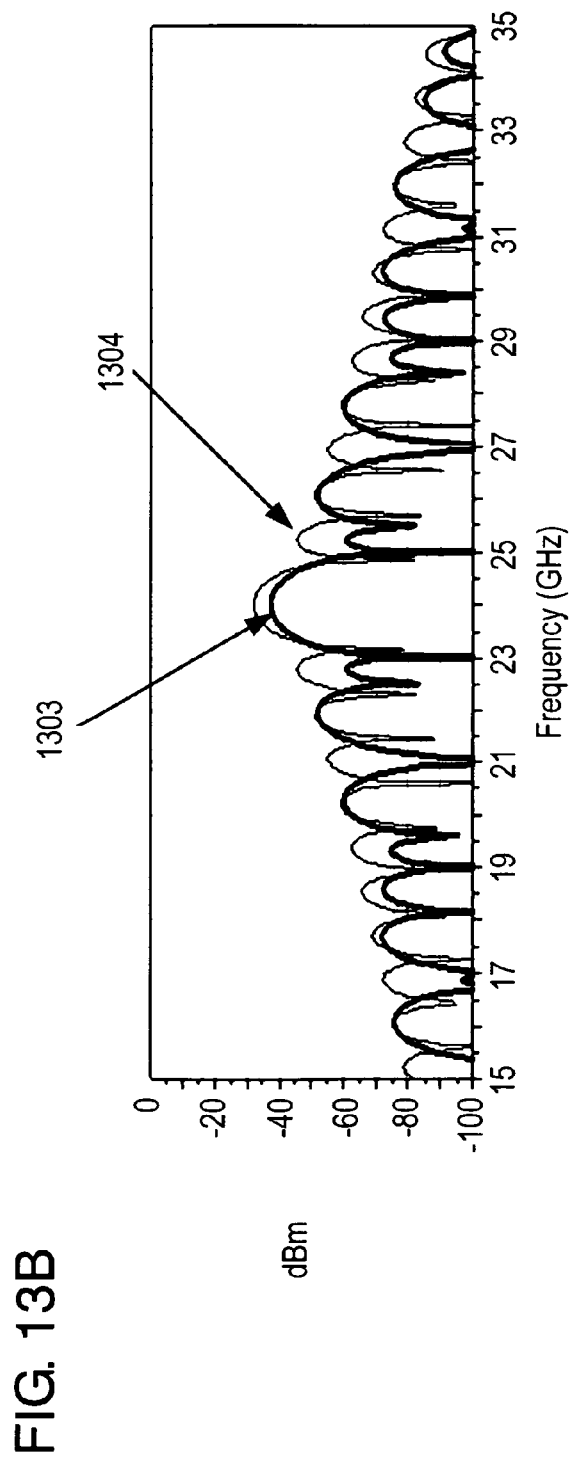
FIG. 13B illustrates the pulse waveform frequency-base characteristic of the same.

FIG. 13A illustrates a pulse waveform time-base characteristic of a continuous pulse cosine waveform signal in the transmitting device according to the embodiment and a conventional single pulse cosine waveform signal. FIG. 13B illustrates a pulse waveform frequency-base characteristic of the same. These characteristics are different from those in FIGS. 12A and 12B in that appropriate rising/falling characteristics are provided. Both continuous pulse cosine waveform signal 1301 and single pulse cosine waveform signal 1302 shown in FIG. 13A are composed of a 24-GHz cosine waveform signal. The pulse width of single pulse cosine waveform signal 1302 is 2.1 ns.

Continuous pulse cosine waveform signal 1301 shows an example of two pulses continued, where the waveform has pulses with a pulse width of 1.3 ns at pulse interval of –0.5 ns, namely the pulses overlap by 0.5 ns. The main spectrum of single pulse cosine waveform signal 1304 spreads over a band of an approximately 1.2-GHz width with a center frequency of 24 GHz, and the power level difference with the spectrum of the adjacent component is approximately 12 dB. Meanwhile, the main spectrum of continuous pulse cosine waveform signal 1303 spreads over a band of an approximately 1.2-GHz width with a center frequency of 24 GHz, and the power level difference to the spectrum of the adjacent component can be increased to approximately 20 dB.

With the above-mentioned makeup, as shown in FIGS. 4B, 5B, 6B, 7B, and 8B, for example, multiple impulse waveforms are output at arbitrary time intervals but shorter than the pulse repetition frequency. Specifically, FIG. 12A, for example, shows the pulse interval as 1 ns. By means of correlation of these impulse waveforms, a signal having a desired frequency spectrum is generated. Consequently, a transmitting device and a transmitting side of a communication system, with a stable characteristic for generating a pulse waveform and using pulses with superior mass productivity, can be implemented in small size and at low cost.

Here, if pulse interval (Pt) satisfies $0 \leq Pt \leq 3T$, where T=pulse width, the frequency band of the frequency spectrum can be arbitrarily changed. Because this method utilizes the fact that continuous pulses are correlative, the pulse interval would adequately be shorter than half the pulse repetition cycle. However, increasing the pulse interval results in increasing the pulse repetition cycle, thus decreasing pulses generated in a certain period of time. This results in decreasing transmissive information volume, and thus the time difference may be roughly 0 to 3T practically. If the time difference is shorter than the pulse width, multiple pulses overlap. However, changing and/or overlapping the pulse frequency bring such advantages as decreasing the power level of the main band (25 GHz in the drawing), slightly expanding the band, and additionally suppressing side lobes (22.8 GHz and 25.2 GHz in the figure) significantly, as shown in FIGS. 13A and 13B for example. With this method, using this embodiment in a communication method with its transmission power level defined by its average and maximum power levels enable increasing its total transmission power level by expanding the spectrum uniformly in the band. Consequently, a long communication distance and communications with a small number of errors can be implemented, and by decreasing the out-of-band power, a filter to be mounted on the device for suppressing such power can be easily implemented. Eventually, new advantages such as cost reduction and downsizing of devices will be provided.

Second Exemplary Embodiment

Figure 14A:
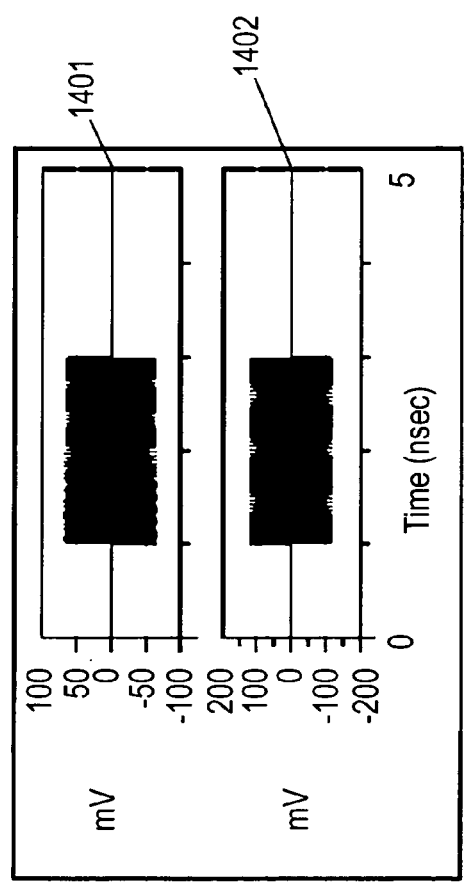
FIG. 14A illustrates the pulse waveform time-base characteristic of a continuous pulse cosine waveform signal in the transmitting device according to the second exemplary embodiment of the present invention and a conventional single pulse cosine waveform signal.
Figure 14B:
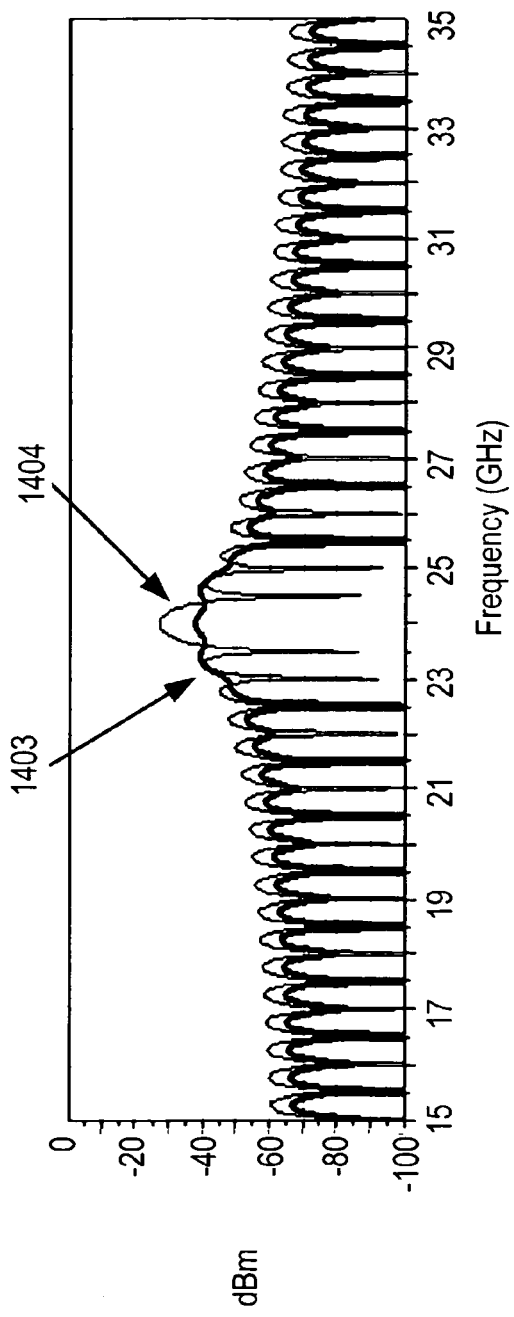
FIG. 14B illustrates the pulse waveform frequency-base characteristic of the same.
Figure 15:
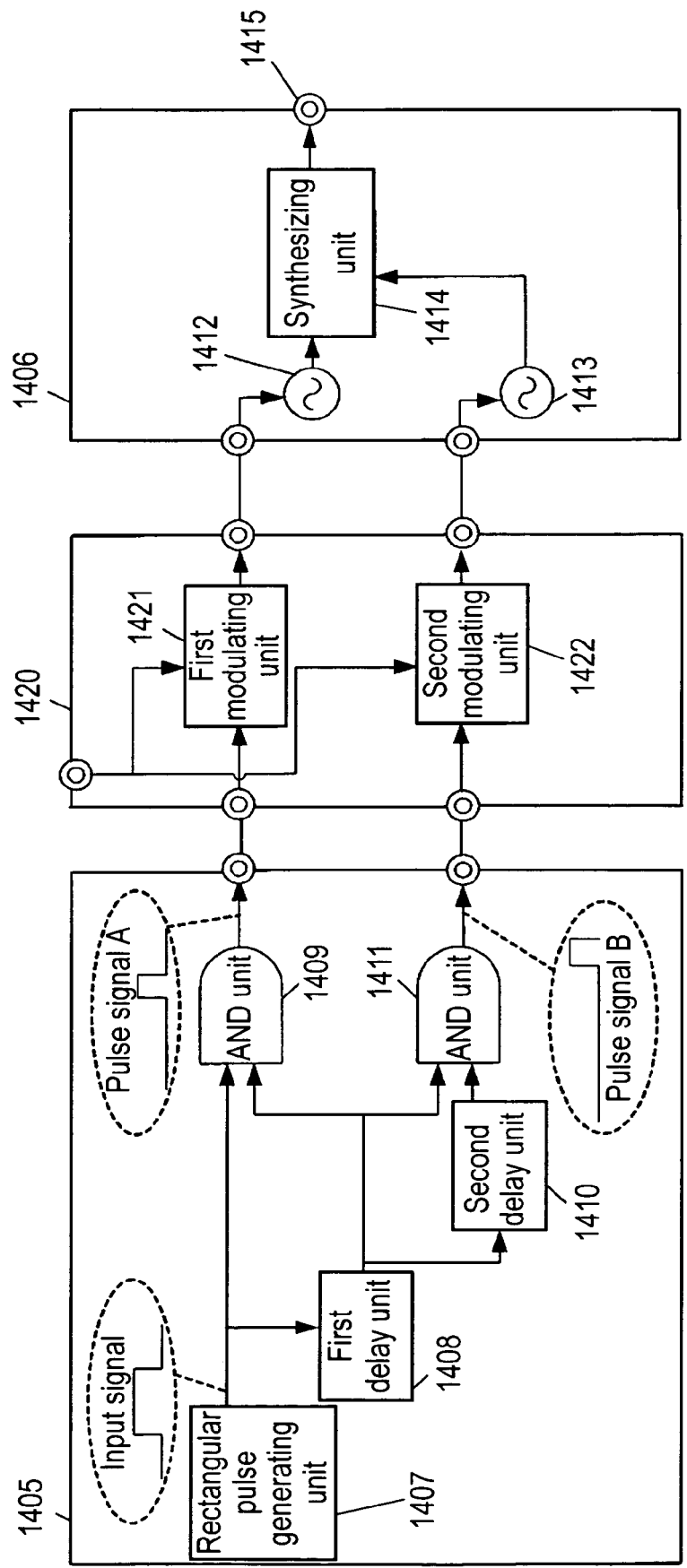
FIG. 15 is a block diagram illustrating the makeup of the group of units from the continuous pulse generating unit through the frequency converting unit in the transmitting device according to the embodiment.

FIG. 14A illustrates the pulse waveform time-base characteristic of a continuous pulse cosine waveform signal in the transmitting device according to the second exemplary embodiment of the present invention and a conventional single pulse cosine waveform signal. FIG. 14B illustrates the pulse waveform frequency-base characteristic of the same. FIG. 15 is a block diagram illustrating the makeup of the group of units from continuous pulse generating unit 1405 through frequency converting unit 1406 in the transmitting device according to the embodiment.

This embodiment is different from the first one in that the cosine waveform signal of continuous pulses to be fed into the continuous pulse cosine waveform signal is composed of signals with different frequencies. The makeup of this embodiment is the same as that in rectangular wave generating unit 201, first delay unit 202, second delay unit 204, and AND units 203 and 205, shown in FIG. 2, corresponding to rectangular wave generating unit 1407, first delay unit 1408, second delay unit 1410, and AND units 1409 and 1411, respectively.

In this embodiment, the cosine waveform signal of continuous pulses is composed of signals with different frequencies, unlike FIG. 12A or 12B. In FIG. 14A, continuous pulse cosine waveform signal 1401 is composed of 23.5-GHz and 24.5-GHz cosine waveform signals. Single pulse cosine waveform signal 1402 is composed of a 24-GHz cosine waveform signal. The example illustrates a case where the pulse width is 2.0 ns for single pulse cosine waveform signal 1402, and continuous pulse cosine waveform signal 1401 has two pulses continued. The waveform has pulses with a width of 1.0 ns at pulse intervals of 0 ns, namely no time difference with a total pulse length of 2.0 ns.

The pulse generation time is 2.0 ns for both signals. However, the main spectrum of single pulse cosine waveform signal 1404 spreads over a band of approximately 1.0 GHz@10 dB with a 24-GHz center frequency. Meanwhile, the main spectrum of signal 1403 spreads over a band of approximately 2 GHz@10 dB with a 24-GHz center frequency, where the power level per unit frequency can be reduced by approximately 10 dB.

The implementing means of the above method is slightly different from those in FIG. 2, 3, 9, 10, or 11. The continuous pulse signals are not synthesized to form continuous pulses by continuous pulse generating unit 1405. But the signals are modulated by first modulator 1421 and second modulator 1422 of modulating unit 1420 respectively, using a data signal. Then they are fed into frequency converting unit 1406 and supplied to two oscillators 1412 and 1413 with different frequencies respectively. From them, synthesizing unit 1414 generates continuous cosine waveform signals with different frequencies and then outputs them from terminal 1415.

In this embodiment, the description is made for a case where continuous pulses generated by continuous pulse generating unit 1405 are modulated by modulating unit 1420, and then frequency-converted by frequency converting unit 1406. However, the present invention is not limited to this case. The same advantages can be obtained if continuous pulses generated by the continuous pulse generating unit are frequency-converted by the frequency converting unit and then modulated by the modulating unit.

Conventionally, communications have been performed by generating single pulses at an appropriate repetition cycle and by modulating them in position, amplitude, phase, or others. Meanwhile in the present invention, not one but more than one pulses are generated together at an appropriate repetition cycle, which is referred to as "continuous pulses". In the conventional method, using single pulses, the frequency spectrum is defined only by the pulse envelope, and thus the shape of an envelope of short pulses with a width shorter than 1 ns needs to be controlled to control the frequency characteristic of the spectrum, which may have been difficult to implement. However, if using continuous pulses, the frequency characteristic of a spectrum can be controlled by changing not individual envelopes but the interval, amplitude difference, phase difference, and/or frequency difference. Controlling the pulse interval, amplitude difference, phase difference, and/or frequency difference is easy, and controlling the frequency characteristic of a spectrum using continuous pulses is highly implementable.

Figure 16A:
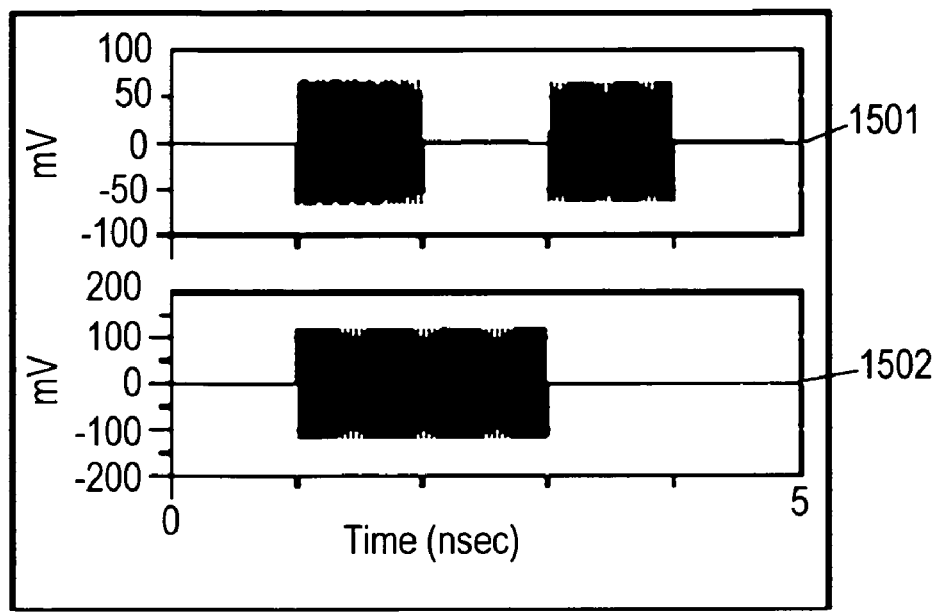
FIG. 16A illustrates the pulse waveform time-base characteristic of a continuous pulse cosine waveform signal in the transmitting device according to the embodiment and a conventional single pulse cosine waveform signal.
Figure 16B:
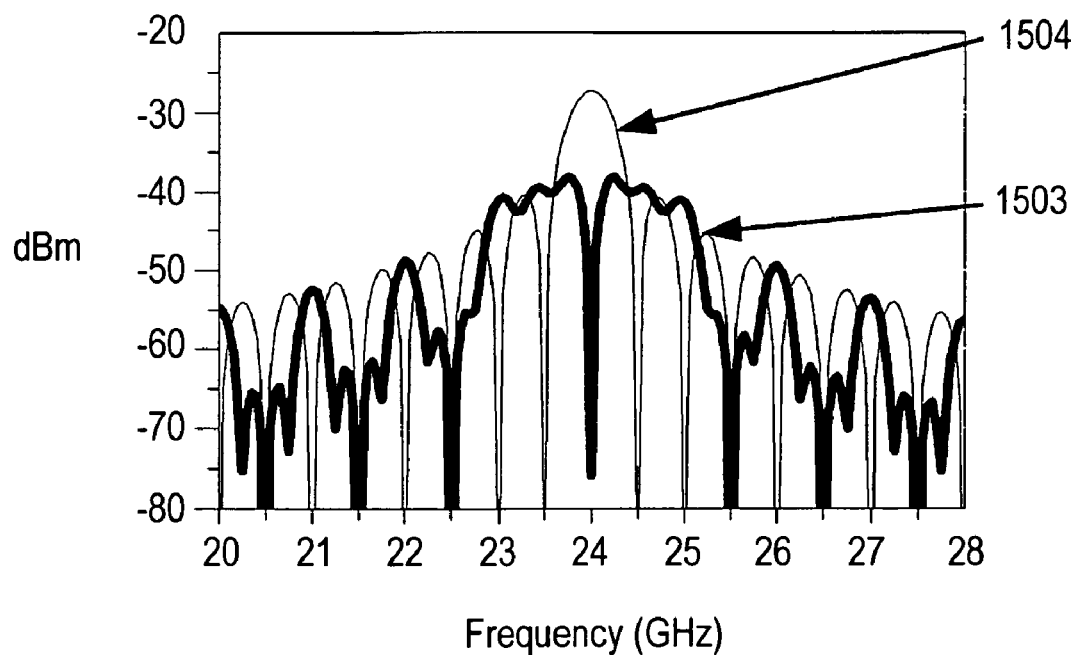
FIG. 16B illustrates the pulse waveform frequency-base characteristic of the same.

FIG. 16A illustrates the pulse waveform time-base characteristic of continuous pulse cosine waveform signal 1501 in the transmitting device according to the embodiment and conventional single pulse cosine waveform signal 1502. FIG. 16B illustrates the pulse waveform frequency-base characteristic of the same, showing continuous pulse cosine waveform signal 1503 and single pulse cosine waveform signal 1504. The characteristics shown in FIGS. 16A and 16B are different from those in FIGS. 14A and 14B in that the pulse interval of the continuous pulses are 1.0 ns. In this case, the main spectrum of continuous pulse cosine waveform signal 1503 is a band of approximately 2.2 GHz@10 dB with a 24-GHz center frequency. The feature is being able to suppress 24-GHz signal emission by 30 dB or more.

Figure 17A:
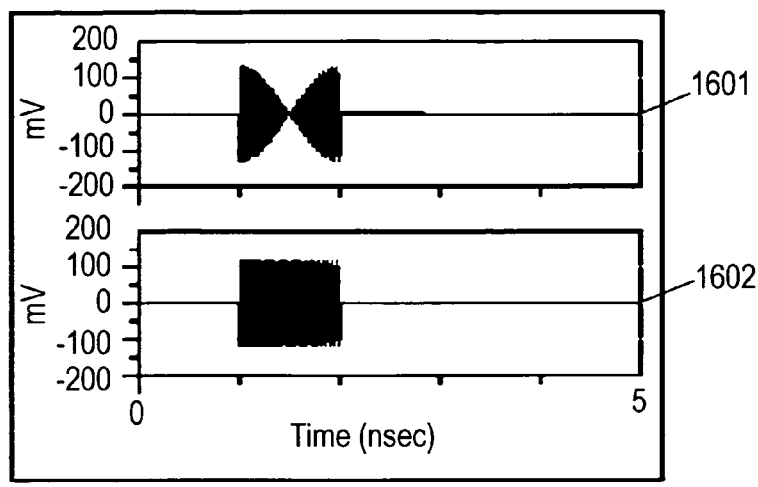
FIG. 17A illustrates the pulse waveform time-base characteristic of a continuous pulse cosine waveform signal in the transmitting device according to the embodiment and a conventional single pulse cosine waveform signal.

FIG. 17A illustrates the pulse waveform time-base characteristic of continuous pulse cosine waveform signal 1601 in the transmitting device according to the embodiment and conventional single pulse cosine waveform signal 1602, where the time-base characteristic is for a case of two pulses with different frequencies existing between 2 ns to 3 ns overlapped. Because the two pulses are different in phase at their beginning, their amplitudes are added together although incompletely. After some cycles pass, the phase relationship changes to cause the amplitudes to be compensated each other, and after some more cycles pass, the phase relationship further changes to cause the amplitudes to be added again.

Figure 17B:
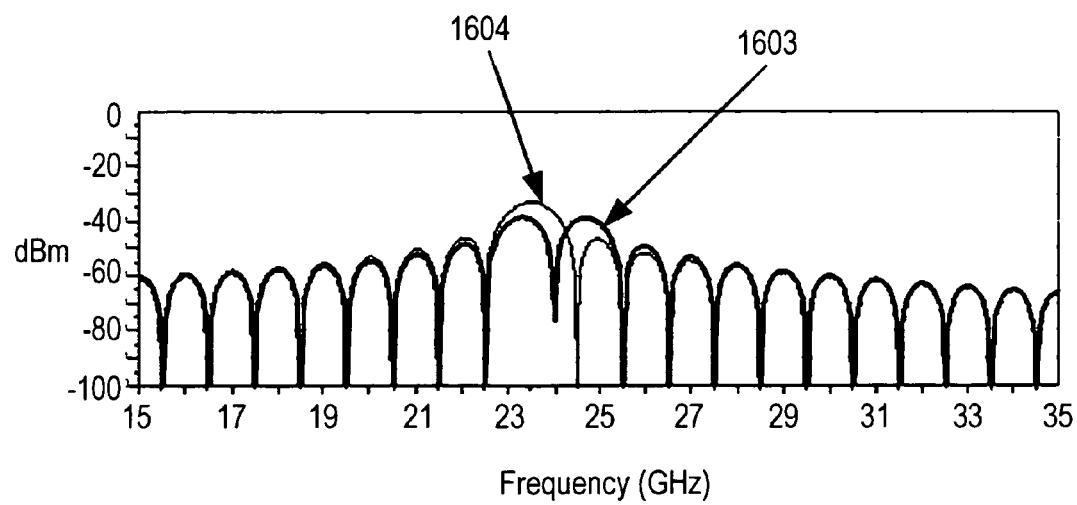
FIG. 17B illustrates the pulse waveform frequency-base characteristic of the same.

FIG. 17B illustrates the pulse waveform frequency-base characteristic of these waveform signals, showing continuous pulse cosine waveform signal 1603 and single pulse cosine waveform signal 1604. The characteristics shown in FIGS. 17A and 17B are different from those in FIGS. 14A and 14B in that the pulse interval of continuous pulses is set to −1.0 ns, namely all pulses overlap. In this case, the main spectrum of continuous pulse cosine waveform signal 1603 is a band of approximately 2.2 GHz@10 dB with a 24-GHz center frequency. The feature is being able to suppress 24-GHz signal emission by 30 dB or more.

Figure 18A:
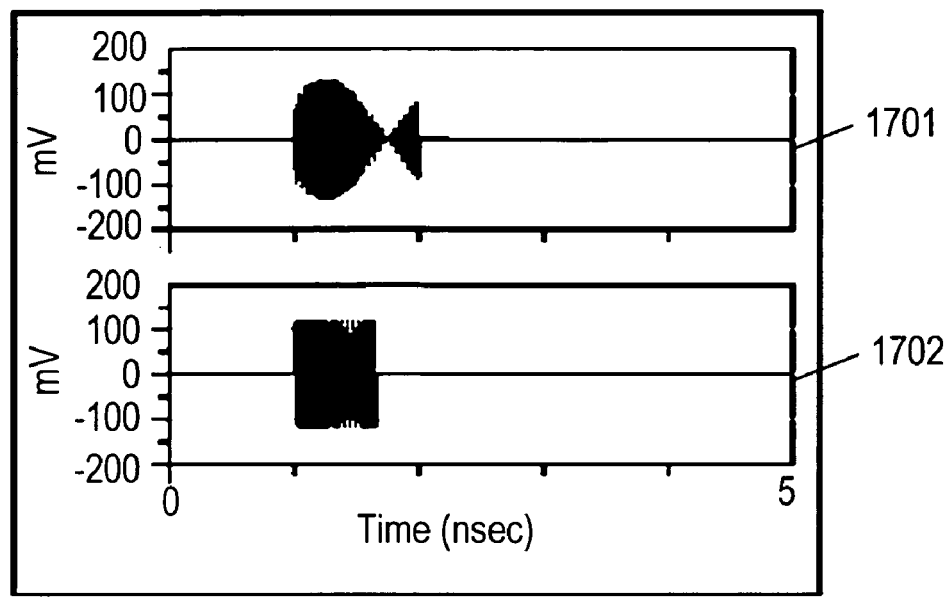
FIG. 18A illustrates the pulse waveform time-base characteristic of a continuous pulse cosine waveform signal in the transmitting device according to the embodiment and a conventional single pulse cosine waveform signal.
Figure 18B:
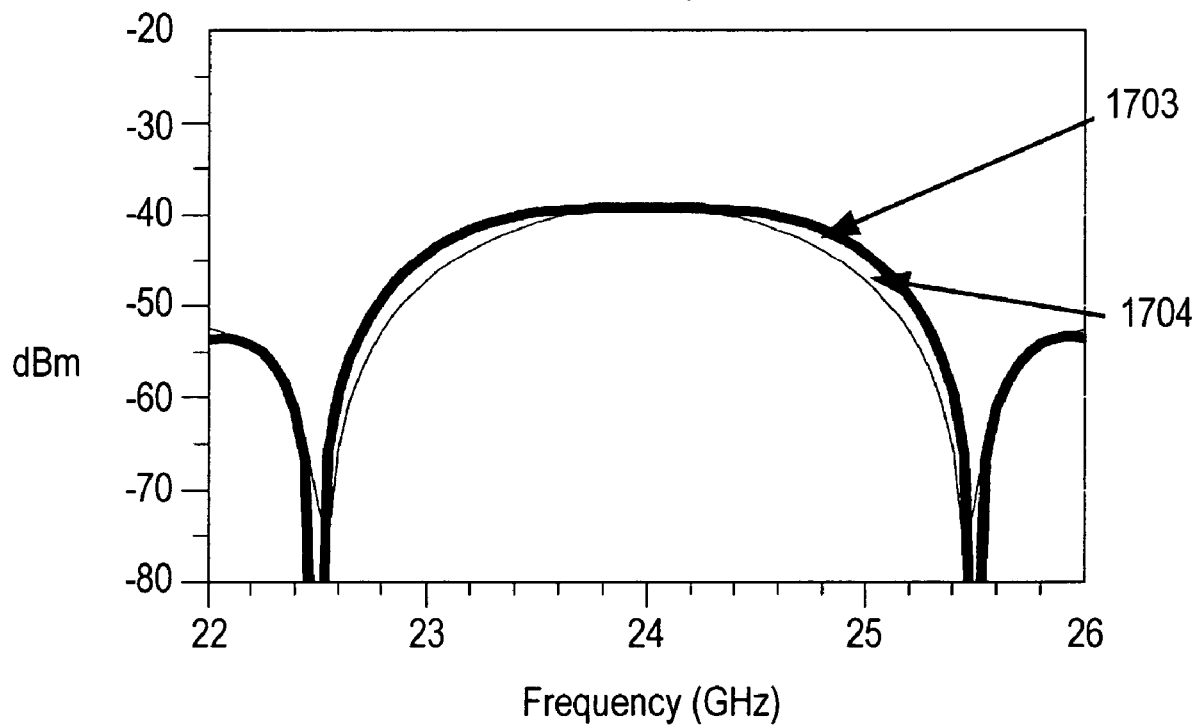
FIG. 18B illustrates the pulse waveform frequency-base characteristic of the same.

FIG. 18A illustrates pulse waveform time-base characteristics of continuous pulse cosine waveform signal 1701 in the transmitting device according to the embodiment and conventional single pulse cosine waveform signal 1702. FIG. 18B illustrates the pulse waveform frequency-base characteristics of the same, showing continuous pulse cosine waveform signal 1703 and single pulse cosine waveform signal 1704. The characteristics shown in FIGS. 18A and 18B are different from those in FIGS. 17A and 17B in that the cosine waveform signals of continuous pulses do not have the same phase but have an appropriate phase difference. FIGS. 18A and 18B illustrate a case of a phase difference of 30 degrees, for example.

In this case, the main spectrums of both single pulse cosine waveform signal 1704 and continuous pulse cosine waveform signal 1703 are to be bands of approximately 3 GHz@50 dB with a 24-GHz center frequency. A band in which the power level is 10 dB lower than that at the center frequency is 2 GHz for single pulse cosine waveform signal 1704. Meanwhile, for continuous pulse cosine waveform signal 1703, such band can be expanded to 2.5 GHz, allowing the available band to be utilized efficiently. The waveforms shown in FIG. 18A have different initial phases in the same reason as in FIG. 17A, and thus the time when the amplitudes are compensated each other is different, thus changing the amplitudes.

Communications, including regular ones, involve a frequency band in which signals are allowed to be emitted (communication band) and a frequency band, adjacent to the communication band, in which signals are not allowed to be emitted (adjacent band). Further, while only the maximum power level is restricted in regular communications, the transmission power level is defined by both the maximum and average power levels particularly in pulse communications. That is to say, to maximize the transmission power level in pulse communications is to emit signals uniformly in the communication band. However, with regular rectangular pulses, for example, the power level drops at both ends of the band as shown by single pulse cosine waveform signal 1704 in FIG. 18B, resulting in a power level lower by several decibels altogether to be transmitted. On the contrary, with continuous pulses, the power level is well controlled at both ends of the band as shown by continuous pulse cosine waveform signal 1703, allowing a large total power to be transmitted.

Figure 19A:
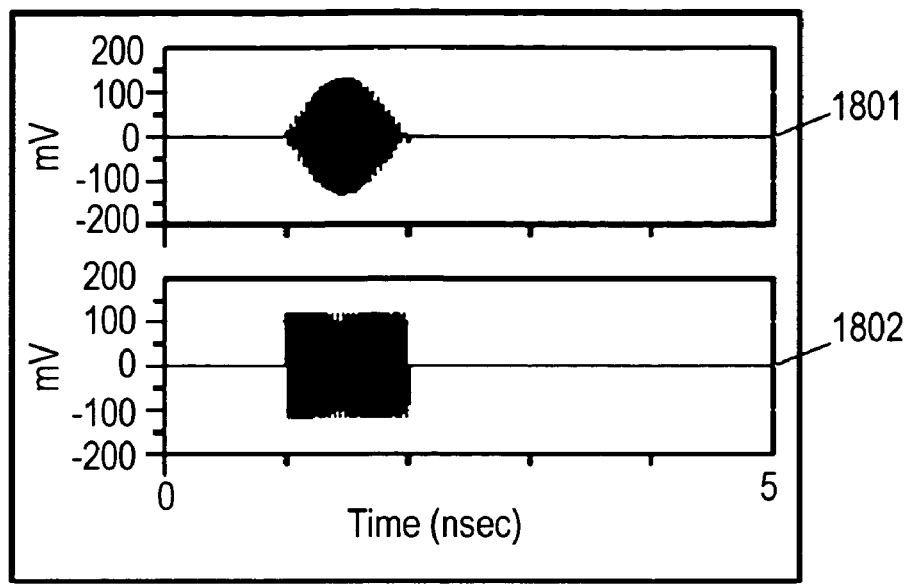
FIG. 19A illustrates the pulse waveform time-base characteristic of a continuous pulse cosine waveform signal in the transmitting device according to the embodiment and a conventional single pulse cosine waveform signal.
Figure 19B:
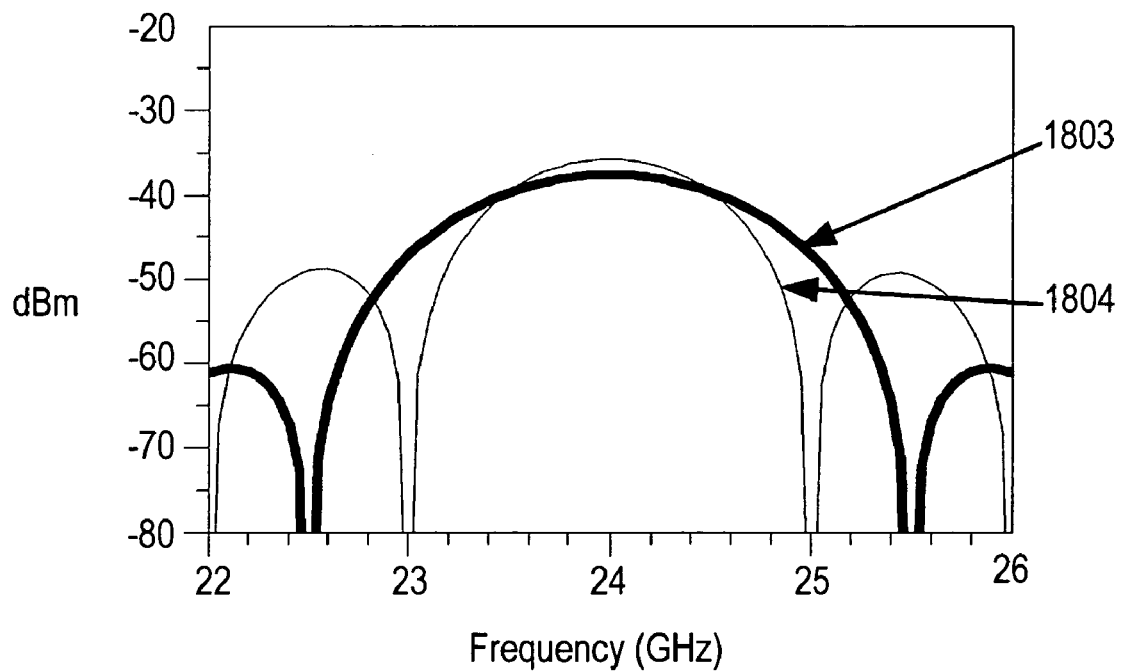
FIG. 19B illustrates the pulse waveform frequency-base characteristic of the same.

FIG. 19A illustrates the pulse waveform time-base characteristics of continuous pulse cosine waveform signal 1801 in the transmitting device according to the embodiment and conventional single pulse cosine waveform signal 1802. FIG. 19B illustrates the pulse waveform frequency-base characteristics of the same, showing continuous pulse cosine waveform signal 1803 and single pulse cosine waveform signal 1804. The characteristics in FIGS. 19A and 19B are different from those in FIGS. 18A and 18B in that the phase differences of the cosine waveform signals of the continuous pulses are set to different values. Controlling the initial phase allows the time waveform and frequency spectrum of pulses to be arbitrarily controlled. In this case, both single pulse cosine waveform signal 1804 and continuous pulse cosine waveform signal 1803 have their main spectrums with a center frequency of 24 GHz. A band in which the power level is 10 dB lower than that at the center frequency is 1.4 GHz for single pulse cosine waveform signal 1804. Meanwhile, for continuous pulse cosine waveform signal 1803, such band can be expanded to 2.0 GHz, allowing the available band to be utilized efficiently.

Here, a description is made for how much the continuous pulses according to the present invention suppress the adjacent band. For example, assuming that the adjacent band is 22.2 GHz in FIG. 19B, components of the peak at 22.5 GHz are uniquely defined by the peak at 24 GHz, with conventional single pulses. Meanwhile with continuous pulses according to the present invention, components of the peak at 22 GHz can be suppressed at a low level. That is to say, continuous pulses can suppress components generated in the adjacent band. Because components in the adjacent band need to be suppressed by a filter, a small amount of components originally generated allows the filter to be a simple one, which brings a large advantage. As mentioned above, using continuous pulses according to the present invention allows easily controlling not only main signal components but side-generating signal components.

Figure 20A:
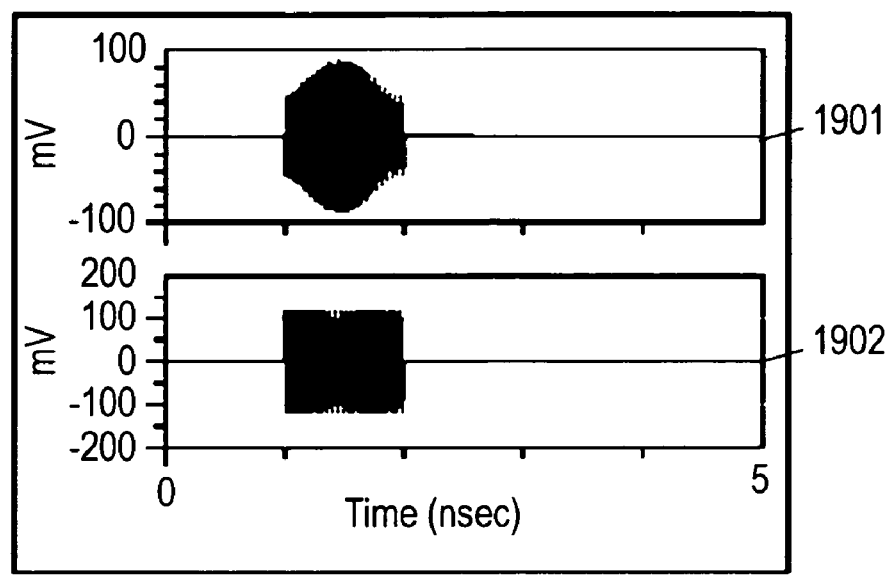
FIG. 20A illustrates the pulse waveform time-base characteristic of a continuous pulse cosine waveform signal in the transmitting device according to the embodiment and a conventional single pulse cosine waveform signal.
Figure 20B:
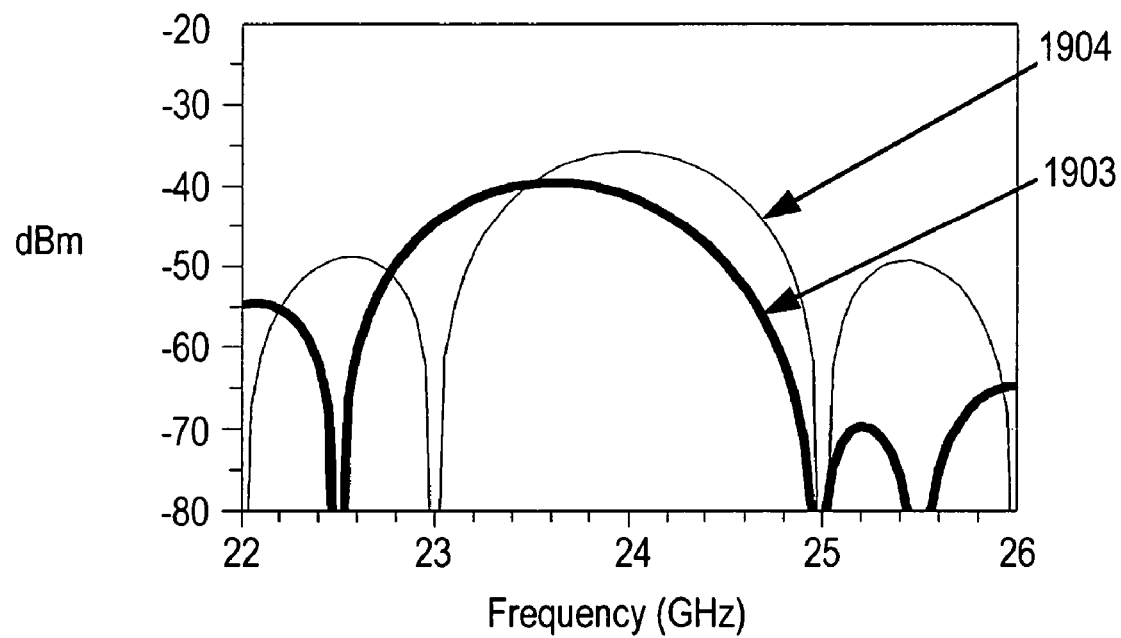
FIG. 20B illustrates the pulse waveform frequency-base characteristic of the same.

FIG. 20A illustrates pulse waveform time-base characteristics of continuous pulse cosine waveform signal 1901 in the transmitting device according to the embodiment and conventional single pulse cosine waveform signal 1902. FIG. 20B illustrates pulse waveform frequency-base characteristics of the same, showing continuous pulse cosine waveform signal 1903 and single pulse cosine waveform signal 1904. The characteristics in FIGS. 20A and 20B are different from those in FIGS. 16A and 16B in that the phase differences of the cosine waveform signals of continuous pulses are set to different values and the center frequency is changed. In this case, the main spectrum of single pulse cosine waveform signal 1904 has a center frequency of 24 GHz. Meanwhile, that of continuous pulse cosine waveform signal 1903 has a center frequency of 23.45 GHz. In this way, arbitrarily changing the phase enables changing the center frequency.

As in the above-mentioned makeup, as a result of continuously outputting multiple impulse waveforms at arbitrary time intervals but shorter than the pulse repetition frequency, a signal having a desired frequency spectrum can be generated by means of correlation of multiple impulse waveforms. Consequently, a transmitting device and a transmitting side of a communication system, with a stable characteristic for generating a pulse waveform and using pulses with superior mass productivity, can be implemented in small size and at low cost.

Third Exemplary Embodiment

Figure 21A:
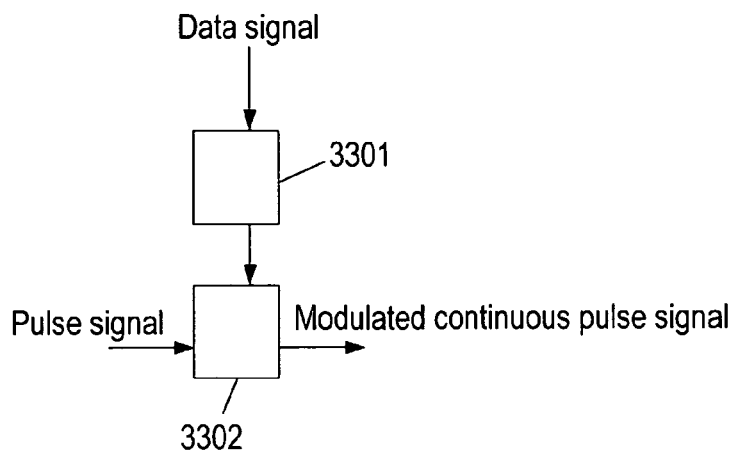
FIG. 21A illustrates the makeup of a modulator in the transmitting device according to the third exemplary embodiment of the present invention.
Figure 21B:
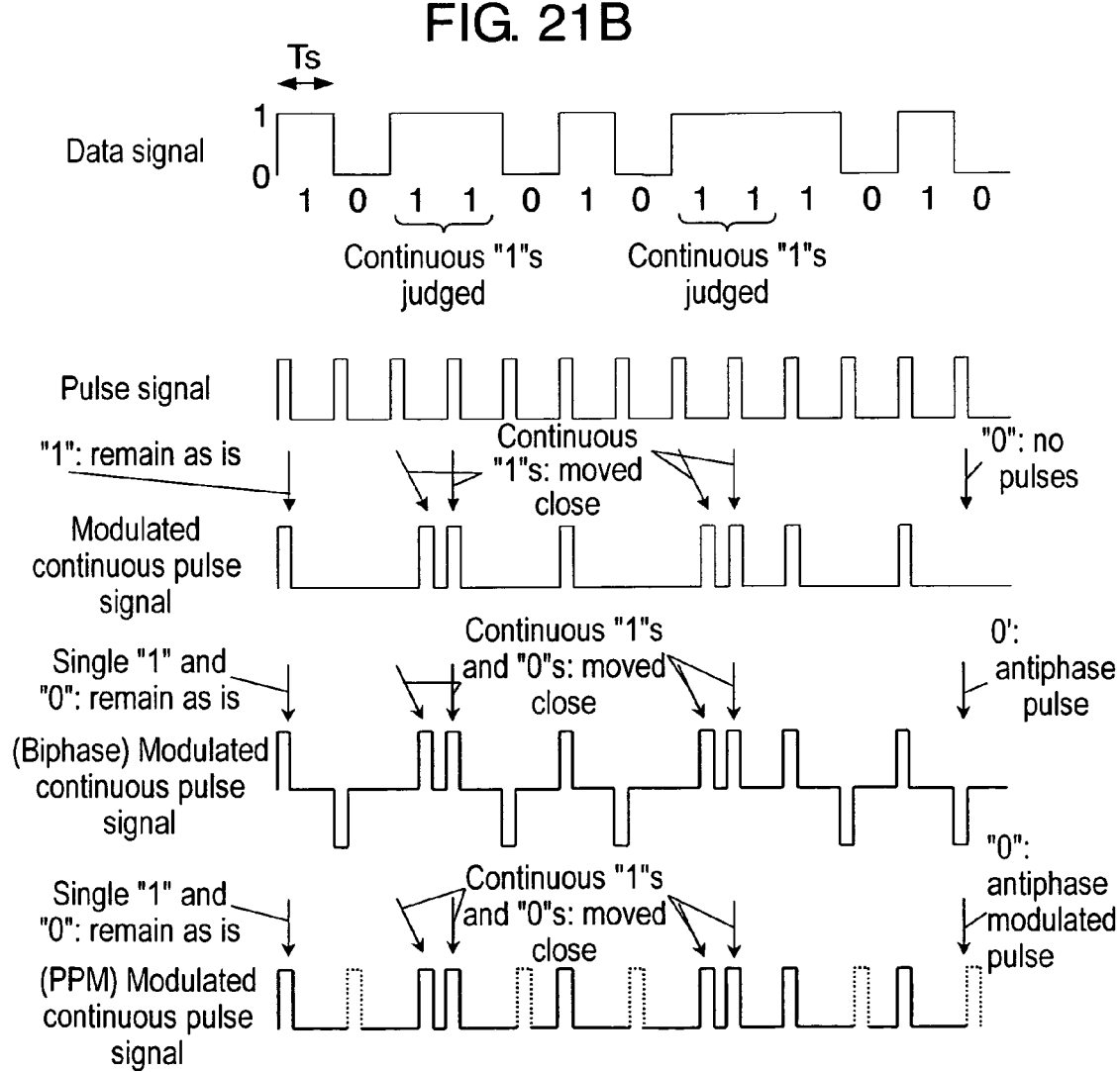
FIG. 21B illustrates waveform signals in the modulator of the transmitting device according to the embodiment.

FIG. 21A illustrates the makeup of the single pulse transmitting unit in the transmitting device according to the third exemplary embodiment of the present invention. FIG. 21B illustrates a waveform signal in the single pulse transmitting unit in the transmitting device according to the same embodiment. This embodiment is different from the first one in that a modulated continuous pulse signal is composed with the pulse interval shortened only for a specific data string. In FIG. 21A, a data signal is first fed into data arrangement judge 3301. Data arrangement judge 3301 judges a specific data string in the data signal. The specific data string may be continuous "1"s for example. Each signal is summarized with reference to FIG. 21B. The data signal is a signal including "1" or "0" arbitrarily repeated. The pulse signal is a signal for determining the pulse width to be transmitted. A description is made for a case of on-off keying (described as "OOK" hereinafter) modulation, for example, as a basic modulation method. After the OOK modulation, a pulse exists at "1" and does not exist at "0". Next, if the data arrangement judge judges that two "1"s are continued, the two pulses are moved close to each other.

As mentioned hereinbefore, for a specific data string such as continuous "1"s, multiple impulse waveforms are continuously output at arbitrary time intervals but shorter than the pulse repetition frequency. This enables generating a signal having a desired frequency spectrum by means of correlation of multiple impulse waveforms. Consequently, a transmitting device and a transmitting side of a communication system, with a stable characteristic for generating a pulse waveform and using pulses with superior mass productivity, can be implemented in small size and at low cost.

Here, the above description shows an example of OOK modulation as a modulation method. However, as shown in FIG. 21B, the same advantages can be obtained in biphase modulation and PPM.

The above description shows a case where the specific data string is two continuous "1"s. However, control parameters may be increased by controlling so that pulses are moved close to each other if three or more "1"s are continuously arranged. With this makeup, highly flexible spectrum control can be performed, thus improving functions for frequency suppression and band limiting.

Fourth Exemplary Embodiment

Figure 22:
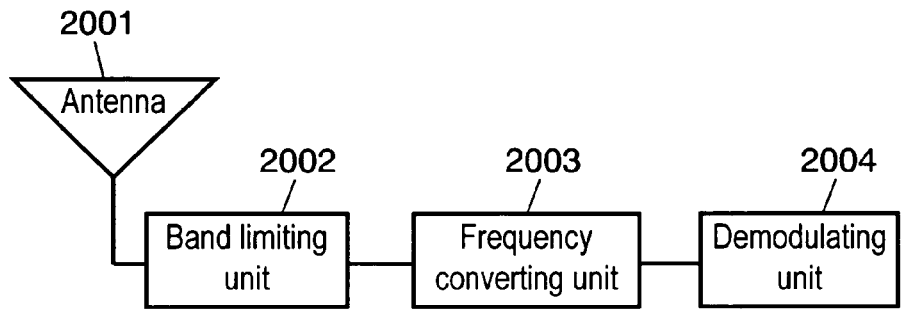
FIG. 22 is a block diagram illustrating the makeup of a receiving device according to the fourth exemplary embodiment of the present invention.

FIG. 22 is a block diagram illustrating the makeup of a receiving device according to the fourth exemplary embodiment of the present invention.

A description is made for a receiving device that receives a signal transmitted from the transmitting device according to the first or second exemplary embodiment aforementioned.

In FIG. 22, the receiving device, a communication apparatus using pulses, is equipped with a modulated pulse receiving unit including antenna 2001, band limiting unit 2002, and frequency converting unit 2003; and demodulating unit 2004. Antenna 2001 receives a continuous pulse signal transmitted from the transmitting device. Band limiting unit 2002 limits the band of a signal acquired by antenna 2001 to extract only a desired signal. Frequency converting unit 2003 converts the frequency of a signal that has passed through band limiting unit 2002, to a signal processible with digital signal processing. Demodulating unit 2004 demodulates the signal converted by frequency converting unit 2003 to extract a data signal.

A description is made for concrete examples of the makeup for each function.

Figure 23A:
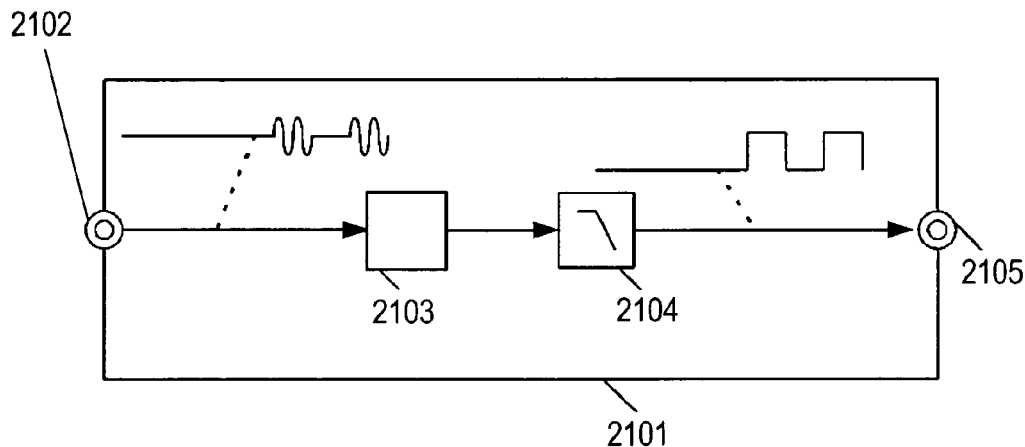
FIG. 23A is a block diagram illustrating the makeup of a frequency converting unit in the receiving device according to the embodiment.
Figure 23B:
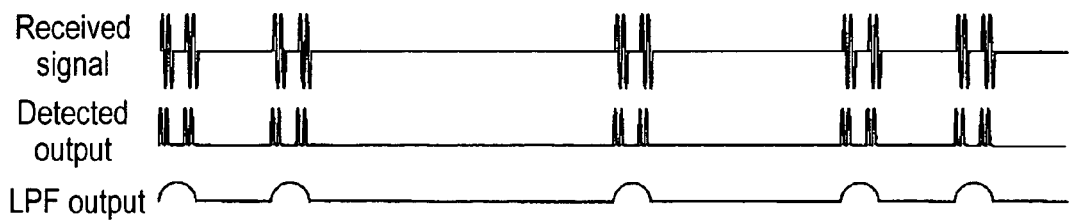
FIG. 23B is a conceptual diagram of a signal in the same frequency converting unit.
Figure 23C:
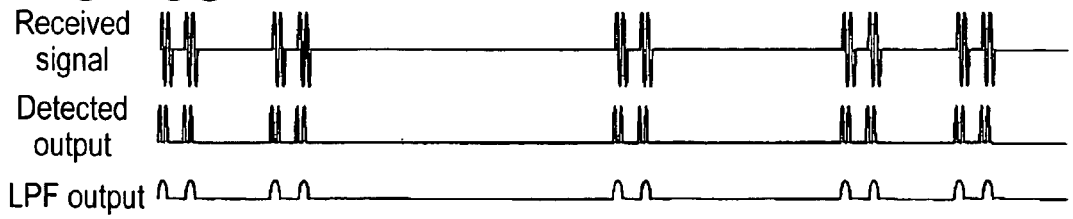
FIG. 23C is a conceptual diagram of a signal in the same frequency converting unit.

FIG. 23A is a block diagram illustrating the makeup of a frequency converting unit included in the receiving device according to the embodiment. FIGS. 23B and 23C are conceptual diagrams of signals in the frequency converting unit. FIG. 23A illustrates a target modulation method in frequency converting unit 2101 with a case of using binary PPM as shown in FIGS. 4A and 4B in the first exemplary embodiment for a transmitting device. In this makeup, with envelope detection, a PPM modulated signal transmitted from an other apparatus, which is a communication target such as a transmitting device, is received by antenna 2001 on this device. The received signal, after unnecessary radio waves, namely out of a communication band, are removed therefrom by band limiting unit 2002, which is a band limiting filter, is fed into received signal input terminal 2102 of frequency converting unit 2101.

The received signal fed into input terminal 2102, after high-frequency components are removed therefrom by detecting unit 2103 and LPF 2104, is reproduced to a pulsatile signal with integration. Detecting unit 2103 can be implemented with a rectification circuit using diodes, for example. In FIG. 23B, the received signal, composed of two continuous pulses, is rectified by detecting unit 2103. The detected output in the embodiment is a half-wave rectified signal. The rectifying method is not limited to half-wave rectification, but half-wave double-voltage rectification or full-wave rectification can be used. The detected output is integrated by LPF 2104 to become an output signal from frequency converting unit 2101, and then is output from frequency-converted received signal output terminal 2105. Here, the continuous pulses as is may be the output signal, depending on the frequency characteristic of LPF 2104, as shown in FIG. 23C.

As mentioned above, a transmission signal can be demodulated by a simple receiving unit such as a wave detector, and multiple impulse waveforms can be continuously output at arbitrary time intervals but shorter than the pulse repetition frequency. This enables generating a signal having a desired frequency spectrum by means of correlation of multiple impulse waveforms. Consequently, a receiving device and a receiving side of a communication system, with a stable characteristic for generating a pulse waveform and using pulses with superior mass productivity, can be implemented in small size and at low cost.

Fifth Exemplary Embodiment

Figure 24A:
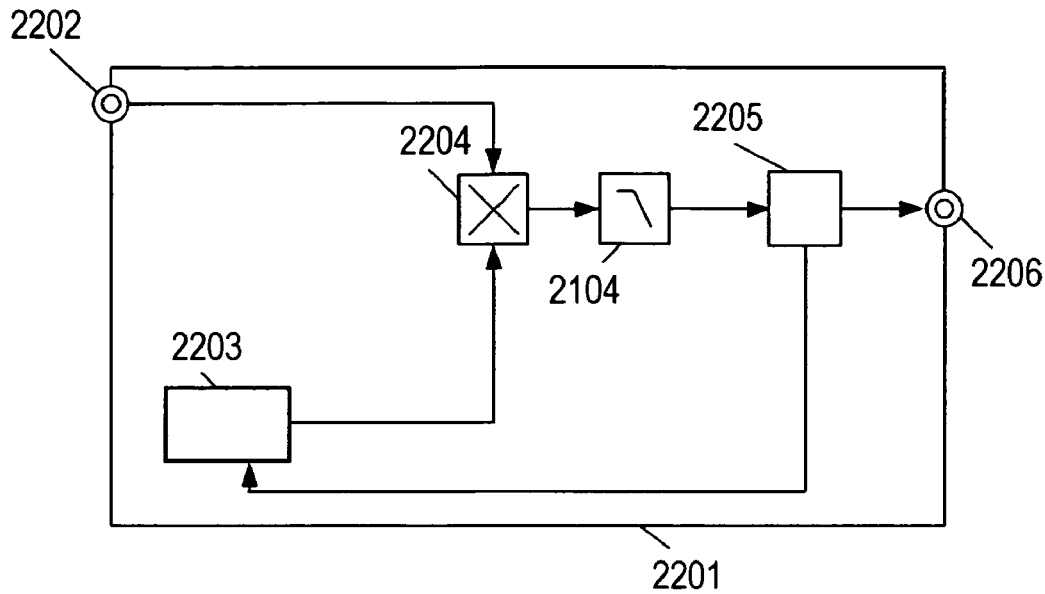
FIG. 24A is a block diagram illustrating the makeup of a frequency converting unit in the receiving device according to the fifth exemplary embodiment of the present invention.
Figure 24B:
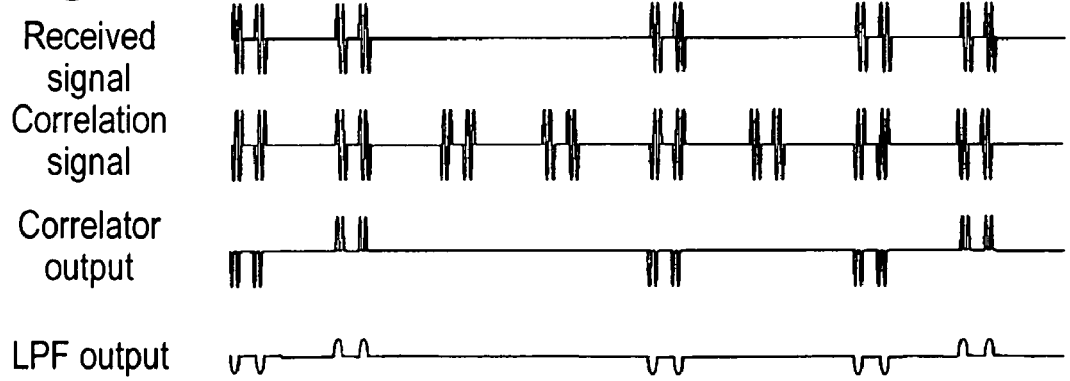
FIG. 24B is a conceptual diagram of a signal in the same frequency converting unit.

FIG. 24A is a block diagram illustrating the makeup of a frequency converting unit of the receiving device according to the fifth exemplary embodiment of the present invention. FIG. 24B is a conceptual diagram of a signal in the frequency converting unit of the receiving device. The embodiment is different from the fourth one in that the receiving and demodulating method uses not envelope detection method but synchronous detection method.

A target modulation method in frequency converting unit 2201 shown in FIG. 24A is illustrated with a case of demodulating a binary PPM modulated signal as shown in FIGS. 4A and 4B. This makeup, with synchronous detection, has generator of continuous pulse cosine waveform signal for correlation 2203 in frequency converting unit 2201, unlike envelope detection in the fourth exemplary embodiment. Correlation is performed by inputting a received signal fed from received signal input terminal 2202 and a correlation signal fed from generator of continuous pulse cosine waveform signal for correlation 2203, into correlator 2204. Using this result, demodulation process in a demodulating unit later described is performed. As a result of this process, judgement errors can be reduced due to noise at a position where a pulse does not exist, for example.

In the makeup, correlation judgment unit 2205 monitors output from correlator 2204 that has passed through LPF 2104. Correlation judgment unit 2205 detects the timing difference between the signal for correlation and the received signal, to feed back a signal for adjusting correlation timing to generator of continuous pulse cosine waveform signal for correlation 2203. Generator 2203 changes output timing of the correlation signal according to this signal to act for establishing synchronization. Correlation judgment unit 2205 outputs a frequency-converted received signal to frequency-converted received signal output terminal 2206. In FIG. 24B, the correlation signal is to have two continuous pulses at both "0" and "1" in PPM. However, the phase of continuous pulses is inverted by 180 degrees from "0" to "1", vice versa, and thus output from the correlator is a positive or negative waveform depending on the position of "0" or "1".

Figure 24C:
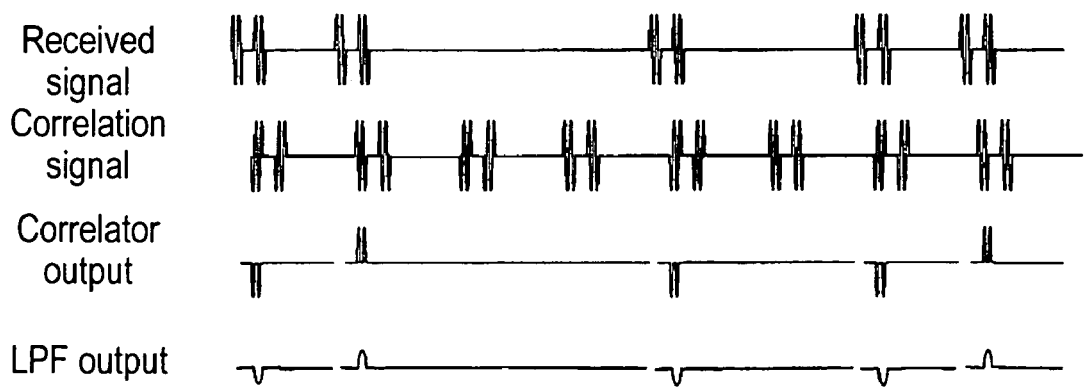
FIG. 24C is a conceptual diagram of a signal in the same frequency converting unit.

The above example shows a case where the received signal agrees with the correlation signal in timing, namely a synchronous state. However, because the received signal and correlation signal are not related to time relationship, timing needs to be matched by some means. For that reason, output from LPF 2104 is fed into correlation judgment unit 2205. Then, judgement is made as timing disagreement if an integral power of a signal is less than a certain amount, for example, and direction for correlative timing adjustment is made to generator of continuous pulse cosine waveform signal for correlation 2203. This causes the timing to be in a state of agreement as shown in FIG. 24B. A signal in a state of timing disagreement is shown in FIG. 24C. Here, the correlation signal agrees with only one of continuous pulses, where the integral power amounts half as compared to that in FIG. 24B. For further disagreement, a signal does not appear at the output of correlator 2204.

As mentioned above, as a result of continuously outputting multiple impulse waveforms at arbitrary time intervals but shorter than the pulse repetition frequency, a signal having a desired frequency spectrum can be generated by means of correlation of multiple impulse waveforms. Consequently, a receiving device and a receiving side of a communication system, with a stable characteristic for generating a pulse waveform and using pulses with superior mass productivity, can be implemented in small size and at low cost.

Sixth Exemplary Embodiment

Figure 25A:
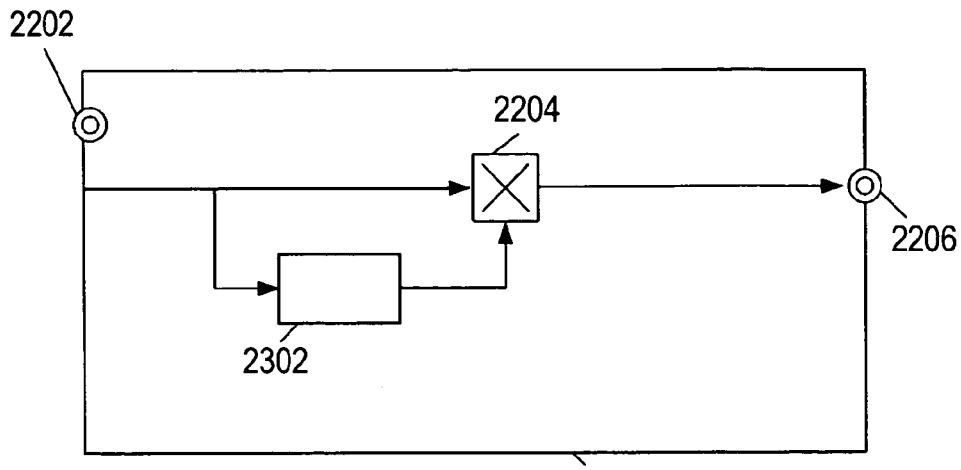
FIG. 25A is a block diagram illustrating the makeup of a frequency converting unit in the receiving device according to the sixth exemplary embodiment of the present invention.
Figure 25B:
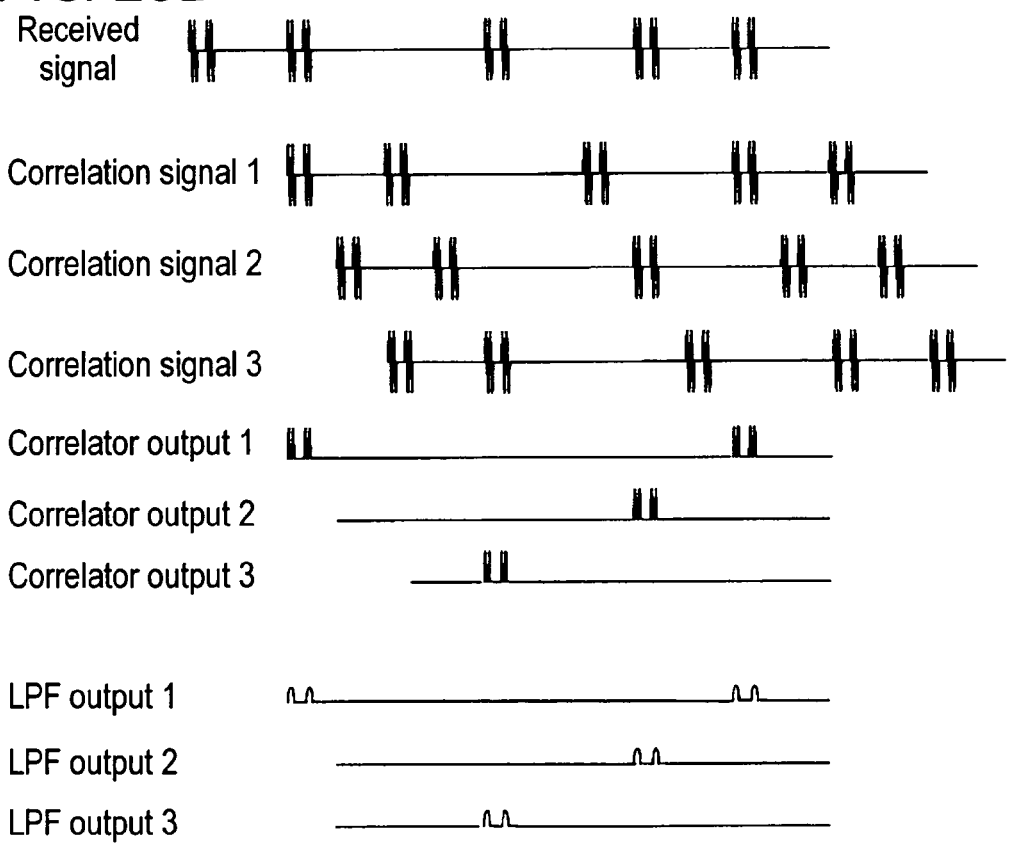
FIG. 25B is a conceptual diagram of a signal in the same frequency converting unit of the same.
Figure 25C:
FIG. 25C is a conceptual diagram of a signal in the same frequency converting unit of the same.

FIG. 25A is a block diagram illustrating the makeup of a frequency converting unit of the receiving device according to the sixth exemplary embodiment of the present invention. FIGS. 25B and 25C are conceptual diagrams of signals in the frequency converting unit of the receiving device.

The embodiment is different from the fourth and fifth ones in that the receiving and demodulating method uses delay detection method, not envelope detection method or synchronous detection method.

A target modulation method in frequency converting unit 2301 shown in FIG. 25A is illustrated with a case of demodulating a binary PPM modulated signal as shown in FIGS. 4A and 4B. This makeup, with delay detection, does not use a generator of continuous pulse cosine waveform signal for correlation, unlike the above synchronous detection. Instead, a correlation signal that is a received signal fed from received signal input terminal 2202, delayed by delay unit 2302, is fed into correlator 2204. This signal is correlated with the received signal, and a demodulation process in the demodulating unit later described is performed using this result. With this makeup, judgement errors can be reduced due to noise at a position where a pulse does not exist, for example.

In FIG. 25B, there are four possible states when performing delay detection on a binary PPM modulated signal, where "state" means a method of delay detection. In OOK modulation, "0" exists with probability ½. Therefore, for continuous "0"s, correlation output is not available unless using correlation relationship with a different delay amount corresponding to this situation. The four states are (1): continuous "0"s, (2): continuous "1"s, (3): from "0" to "1", and (4): from "1" to "0". In order to judge these states, correlator 2204 and delay unit 2302 are to be three series, for example. The delay of delay unit 2302 is to be a value with which correlation output exists in three series such as (1) or (2), (3), and (4), out of the aforementioned four states. The waveform of the correlation signals are illustrated by correlation signals 1 through 3. Correlating these signals with the received signal provides correlator output 1 through 3. Correlator output 1 indicates state (4); correlator output 2 indicates state (1) or (2); and correlator output 3 indicates state (3).

The above description is made for a frequency converting unit and a demodulating unit for a binary PPM modulated signal as shown in FIGS. 4A, 4B. However, for biphase modulation as shown in FIGS. 5A and 5B, and for PAM as shown in FIGS. 6A and 6B, the technique for receiving a biphase modulated signal and PAM modulated signal with delay detection is publicly known and practicable.

As mentioned above, as a result of continuously outputting multiple impulse waveforms at arbitrary time intervals but shorter than the pulse repetition frequency, a signal having a desired frequency spectrum can be generated by means of correlation of multiple impulse waveforms. Consequently, a receiving device and a receiving side of a communication system, with a stable characteristic for generating a pulse waveform and using pulses with superior mass productivity, can be implemented in small size and at low cost.

Seventh Exemplary Embodiment

Figure 26A:
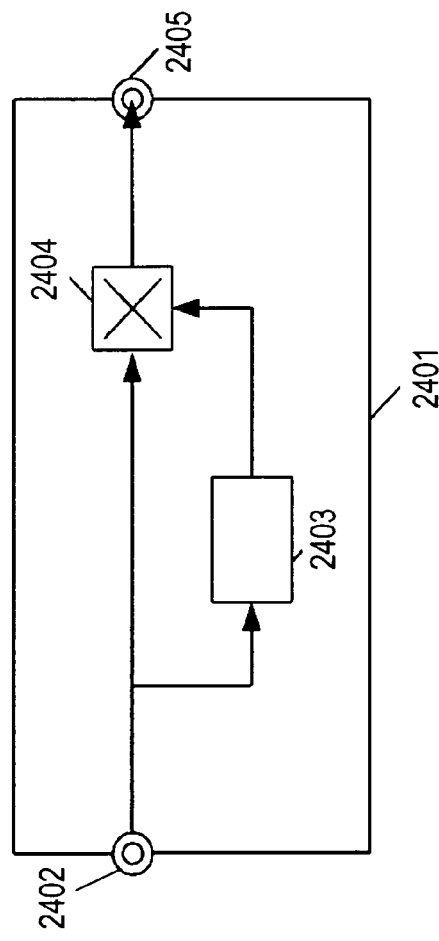
FIG. 26A is a block diagram illustrating the makeup of a frequency converting unit in the receiving device according to the seventh exemplary embodiment of the present invention.
Figure 26B:
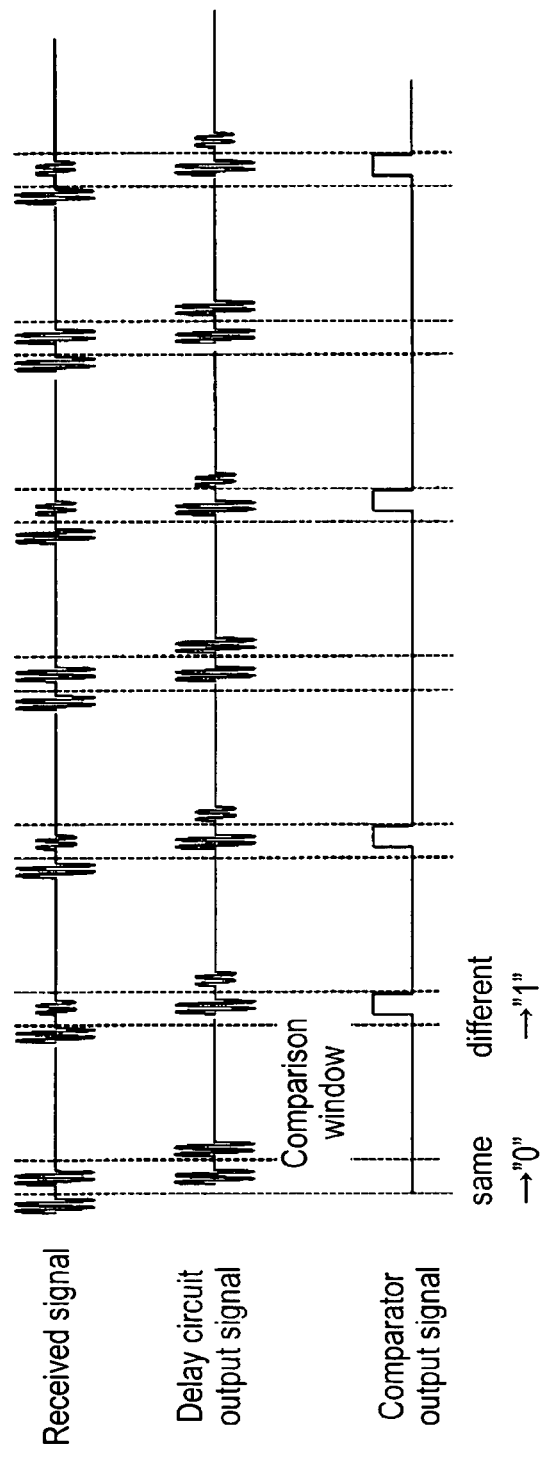
FIG. 26B is a conceptual diagram of a signal in the frequency converting unit of the same.

FIG. 26A is a block diagram illustrating the makeup of a frequency converting unit of the receiving device according to the seventh exemplary embodiment of the present invention. FIG. 26B is a conceptual diagram of a signal in frequency converting unit 2401 of the receiving device.

The embodiment is different from the fourth and fifth ones in that correlation of the first and second pulse signals of the continuous pulse cosine signal waveforms is used instead of the waveform correlation between continuous pulse cosine signals.

A target modulation method in frequency converting unit 2401 shown in FIG. 26A is illustrated with a case of demodulating a binary PAM modulated signal as shown in FIG. 7. A received signal fed from received signal input terminal 2402 and a signal that is the received signal delayed by delay unit 2403 are input into comparator 2404, and judgement is made whether or not the two signals are of the same amplitude. Comparator 2404 outputs a frequency-converted received signal to frequency-converted received signal output terminal 2405. In FIG. 26B, because regular PAM judges "0" and "1" with presence or absence of a signal, a threshold level for judging presence or absence of a signal needs to be changed according to the power ratio of signal to noise, for example.

However, in the above-mentioned makeup, comparison is made for the amplitude of the first and second pulses to derive the difference in amplitude. Differential coding in PAM is publicly known technology, where "1" is provided if a pulse is larger than the previous one in amplitude; and "0", if the same. In this way, the threshold needs no change. In order to compare the amplitude of signals applied with noise roughly at the same time, namely substantially the same noise, influence of noise can be effectively removed.

With the above-mentioned makeup, as a result of continuously outputting multiple impulse waveforms at arbitrary time intervals but shorter than the pulse repetition frequency, a signal having a desired frequency spectrum can be generated by means of correlation of multiple impulse waveforms. Consequently, a receiving device and a receiving side of a communication system, with a stable characteristic for generating a pulse waveform and using pulses with superior mass productivity, can be implemented in small size and at low cost.

Eighth Exemplary Embodiment

Figure 27A:
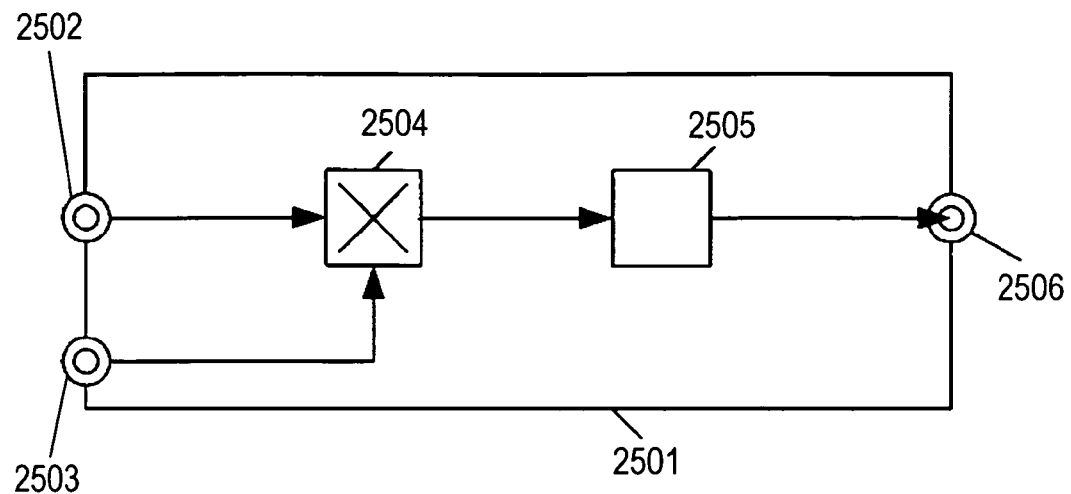
FIG. 27A is a block diagram illustrating the makeup of a frequency converting unit in the receiving device according to the eighth exemplary embodiment of the present invention.
Figure 27B:
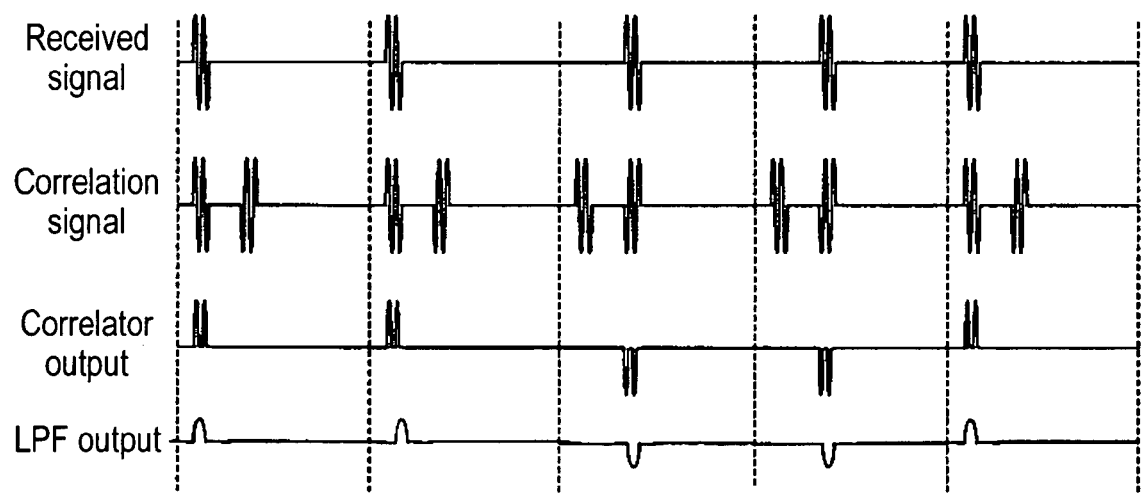
FIG. 27B is a conceptual diagram of a signal in the frequency converting unit of the same.

FIG. 27A is a block diagram illustrating the makeup of a frequency converting unit of the receiving device according to the eighth exemplary embodiment of the present invention. FIG. 27B is a conceptual diagram of a signal in frequency converting unit 2501 of the receiving device.

This embodiment is different from the exemplary embodiments fourth through seventh in that one of pulse cosine signals is used as a signal for waveform correlation, for demodulating a modulated signal, not for transmitting data.

In the transmitting device according to the embodiment, continuous pulse generating unit 101 with the makeup shown in FIG. 1 has a function of a single pulse transmitting unit as well; modulating unit 102, a single pulse modulating unit; and frequency converting unit 103, a single pulse frequency converting unit. The single pulse transmitting unit in continuous pulse generating unit 101 generates single pulses. The single pulse modulating unit of modulating unit 102 pulse-position modulates single pulses using transmission data. The single pulse frequency converting unit in frequency converting unit 103 frequency-converts modulated single pulses from modulating unit 102. Output from the single pulse frequency converting unit is fed into band limiting unit 104. Further, in the receiving device according to the embodiment, frequency converting unit 2003 with the makeup in FIG. 22 composes a two-signal receiving unit (not illustrated), capable of receiving two signals. The two-signal receiving unit outputs a received signal and correlation signal, and these outputs are fed into received signal input terminal 2502 and correlation signal input terminal 2503 in FIG. 27A.

A target modulation method in frequency converting unit 2501 shown in FIG. 27A is illustrated with a case of demodulating a binary PPM modulated signal. The receiving device receives a PPM modulated received signal, and a correlation signal composed of multiple continuous pulses according to a position of a PPM modulated pulse, and feeds them respectively into frequency converting unit 2501. In this case, the received signal is fed from received signal input terminal 2502 into correlator 2504, the correlation signal is fed from correlation signal input terminal 2503 into correlator 2504, and LPF 2505 integrates them for judgement. LPF 2505 outputs the frequency-converted received signal to frequency-converted received signal output terminal 2506. As a result of delay detection, for example, of a PPM modulated signal, all the waveforms of the correlation signal have the same phase. "0" and "1" are judged according to presence or absence of a signal and the fact that a signal does not exist simultaneously at a pulse position indicating "0" and "1". Accordingly, a decision circuit for a threshold voltage to be a reference for signal judgement becomes complicated, and so does an authentication circuit for a signal existing at "0" and "1", and for a falsely-detected signal due to noise.

However, with the above-mentioned makeup, like each waveform shown in FIG. 27B, pulses for correlation have been transmitted according to each pulse position of a PPM-modulated received signal, and thus correlator 2504 can assuredly generate correlation output. Here, because pulses for correlation are generated at the transmission side, correlation can be performed at the receiving side even if the position of a pulse to be modulated is fixed, or changed randomly, for example. Moreover, if the phase is to be different between the first and second pulses, the threshold voltage is to be 0 V because the correlation waveforms at the pulse position indicating "0" and "1" are different in phase as shown in FIG. 27B. The voltage of a desired signal becomes predominant only by maintaining the peak voltage of each signal, and thus the influence of a falsely-detected signal can be easily suppressed.

As mentioned above, as a result of continuously outputting multiple impulse waveforms at arbitrary time intervals but shorter than the pulse repetition frequency, a signal having a desired frequency spectrum can be generated by means of correlation of multiple impulse waveforms. Consequently, a receiving device and a receiving side of a communication system, with a stable characteristic for generating a pulse waveform and using pulses with superior mass productivity, can be implemented in small size and at low cost.

Ninth Exemplary Embodiment

Figure 28:
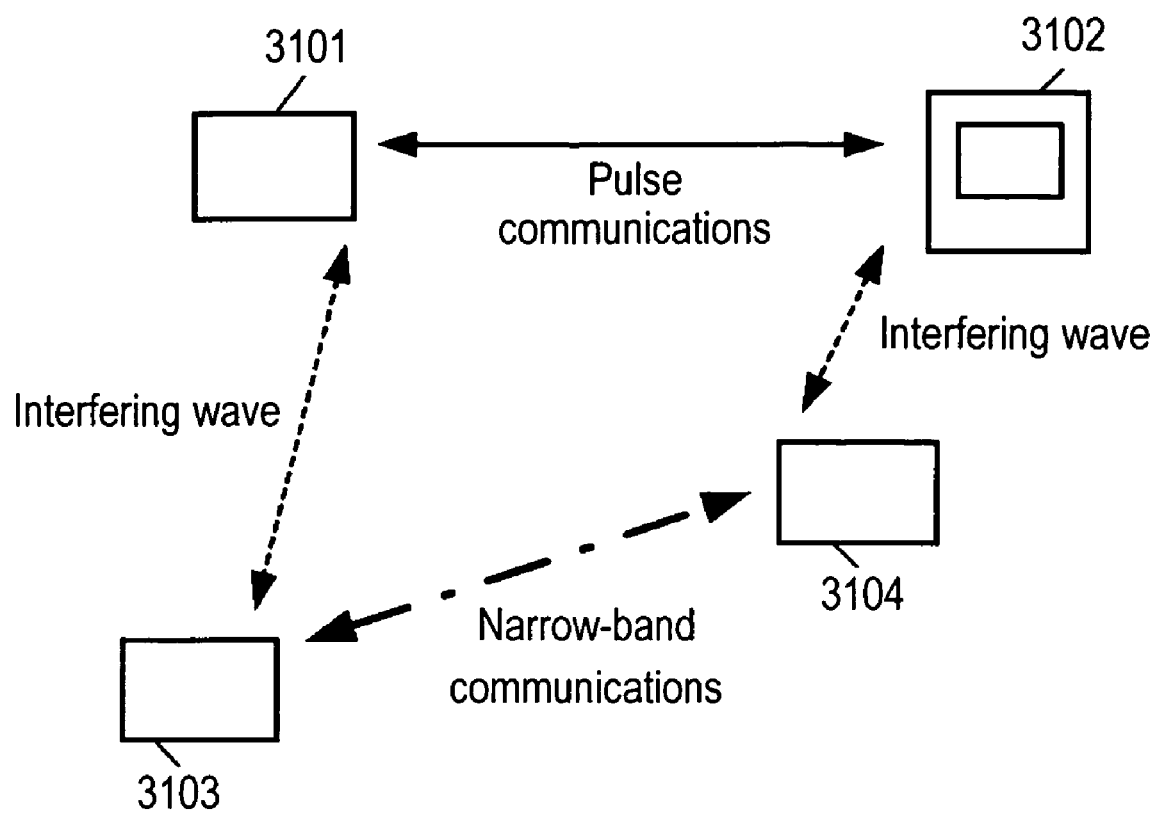
FIG. 28 is a schematic diagram illustrating the makeup of a communication system according to the ninth exemplary embodiment of the present invention.

FIG. 28 is an example communication system equipped with a transmitting device and a receiving device using continuous pulses according to the exemplary embodiments first through eighth of the present invention.

In FIG. 28, home server 3101 supplies TV 3102 with broadcast contents by means of pulse communications. PCs 3103 and 3104 communicate with each other by means of a narrow-band wireless system.

For PCs 3103 and 3104 performing narrow-band communications, a signal for pulse communications performed by home server 3101 and TV 3102 is an interfering wave. A description is made with the examples shown in FIGS. 12A and 12B. In narrow-band communications with a center frequency of 23.2 GHz, the power level provided for the narrow-band communications has a difference of approximately 20 dB between a case of using a conventional single pulse cosine waveform and that of a continuous pulse cosine waveform of the present invention. In narrow-band communications with a center frequency of 23.8 GHz, the difference is approximately 50 dB, where the influence is largely different.

Here, contrarily to the above, a signal in narrow-band communications between PCs 3103 and 3104 is an interfering wave for pulse communications between home server 3101 and TV 3102. In this case, providing information to a pulse with low waveform correlation with a narrow-band communication signal out of multiple continuous pulses will reduce the influence.

In the above-mentioned wireless system, a pulse communication system can be implemented with simple makeup at low cost by using a transmitting device and a receiving device employing continuous pulses according to the exemplary embodiments first through eighth.

Tenth Exemplary Embodiment

Figure 29A:
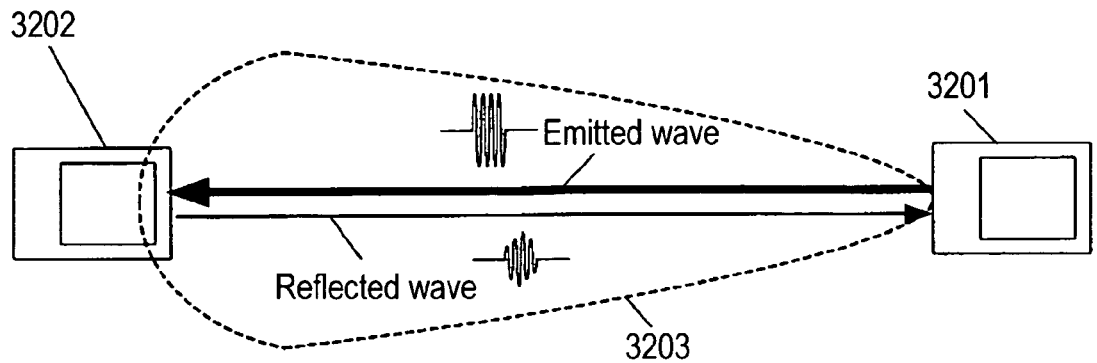
FIG. 29A is a schematic diagram illustrating the makeup of a communication system according to the tenth exemplary embodiment of the present invention.
Figure 29B:
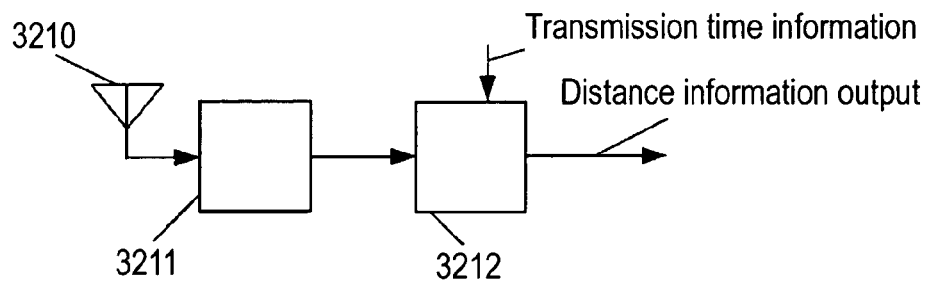
FIG. 29B is a block diagram illustrating the makeup of a receiving device in the same communication system.
Figure 29C:
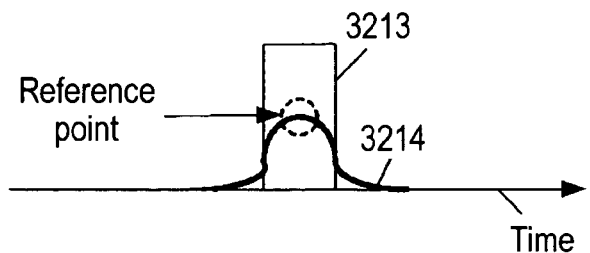
FIG. 29C is a conceptual diagram of a signal in the same communication system.
Figure 29D:
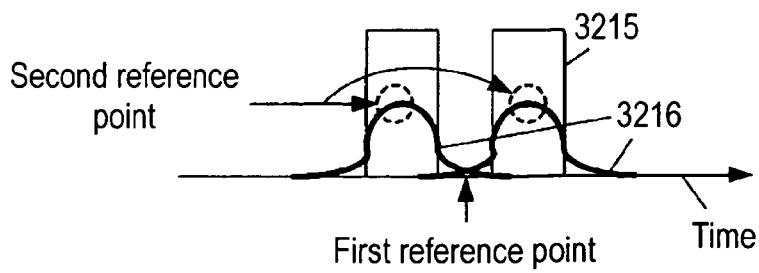
FIG. 29D is a conceptual diagram of a signal in the same communication system.
Figure 30:
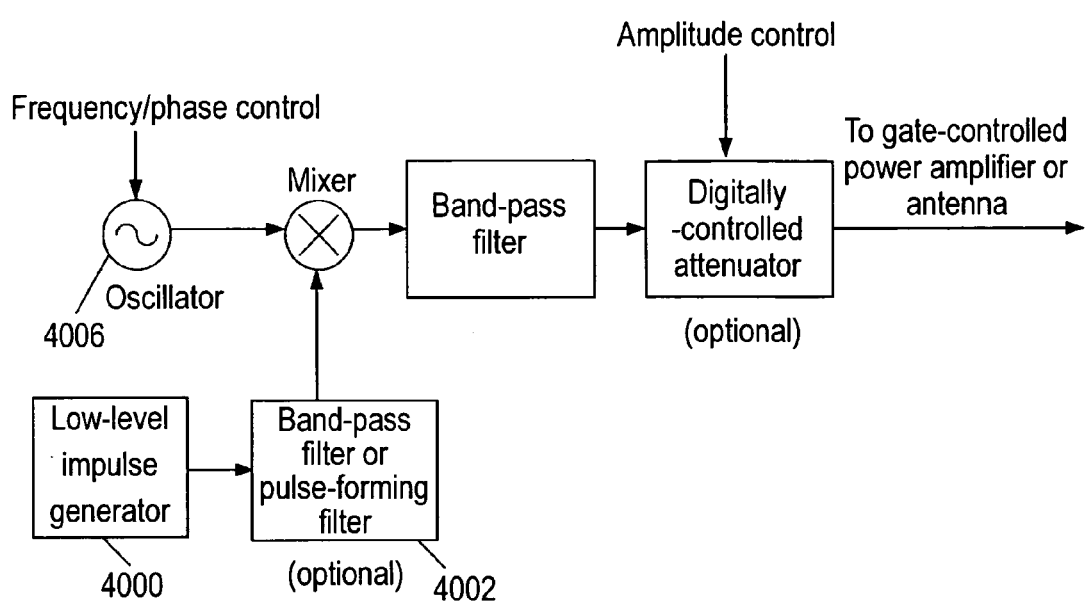
FIG. 30 is a block diagram illustrating the makeup of a conventional transmitting device.

FIG. 29A is a schematic diagram illustrating the makeup of a communication system according to the tenth exemplary embodiment of the present invention. FIG. 29B is a block diagram illustrating the makeup of a receiving device in the communication system. FIGS. 29C and 29D are conceptual diagrams of signals in the communication system, showing transmitted pulse waveform 3215 and received pulse waveform 3216. Specifically, the communication system according to the embodiment is an example of a communication system that is equipped with a transmitting device and a receiving device employing continuous pulses in the exemplary embodiments first through eighth, and composes a distance-measuring system.

In FIG. 29A, both first mobile object 3201 and second mobile object 3202 are moving. The first mobile 3201 object is equipped with a transmitting device (not illustrated) and a receiving device (not illustrated) for receiving a signal that the transmitting device has transmitted and has been reflected by another object, to communicate for measuring the distance to second mobile object 3202. Distance-measuring area 3203 is a distance-measurable range for the first mobile object.

A description is made for distance-measuring actions in the communication system according to the embodiment, using FIGS. 29A and 29B. A pulse signal emitted from the transmitting device of first mobile object 3201 reaches second mobile object 3202, and returns to first mobile object 3201 due to reflection. The returned signal is received by receiving antenna 3210 on the receiving device of first mobile object 3201, and frequency-converted by high-frequency receiving unit 3211, to provide a pulse waveform.

Flying time calculating unit 3212 calculates the time difference between the receipt time of the obtained pulse waveform and the transmission time of the emitted pulse, and converts the time difference with the propagation velocity of a radio wave, to obtain distance information. However, as shown in FIG. 29C, although transmitted pulse waveform 3213 is rectangular, received pulse waveform 3214 becomes a deformed one due to frequency band limiting and added noise with ICs and an antenna in the transmitting device and receiving device, scattering in reflection on second mobile object 3202, a multipath component in reception, and an interfering wave from other electronic devices.

Conventionally, the received pulse arrival time has been determined according to a reference point around the peak of the deformed waveform, making precise distance measurement difficult due to tendency of incorrect time judgement, including time change in waveform deformation. The only way to solve this problem is to reduce the pulse width, making extremely difficult to implement a circuit. Contrarily to this method, in the method employing a continuous pulse waveform shown in FIG. 29D, multiple reference points for time determination can be set, where a first reference point is between continuous pulses and a second one is around the peak of the waveform, in a conventional manner. This makeup improves measurement precision, allowing more accurate distance measurement.

Here, for the first reference point, to reduce the intervals of continuous pulses is to cause a pulse not to exist for extremely short time, which brings the same advantage as that in a case where the width of pulses for measurement is reduced when single pulses are used.

In the distance-measuring system, which is a communication system according to the embodiment, as a result of using a transmitting device and a receiving device employing continuous pulses according to the exemplary embodiments first through eighth, a communication system, namely a pulse distance-measuring system can be implemented with a simple makeup at low cost.

Here, in the exemplary embodiments first through tenth, the description is made for wireless communications. However, the present invention is not limited to this, but effective for wired communications as well such as coaxial cable, waveguide, or fiber-optic cable.

INDUSTRIAL APPLICABILITY

As mentioned above, the present invention uses multiple impulse waveforms continuously generated at arbitrary time intervals, as a transmission signal. This makeup allows the frequency band of a frequency spectrum to be arbitrarily changed. Further, a null point can be provided in the band. These characteristics can provide a transmitting device having less influence on other systems. Meanwhile, a receiving device can be provided that receives transmission data by receiving and demodulating a signal transmitted using continuous pulses continuously generating multiple impulse waveforms. Further, a communication system that is a combination of these devices can be provided. They are useful as a transmitting device, receiving device, and communication system using these devices in pulse radio mainly using a microwave or milliwave.

The invention claimed is:

1. A transmitting device, comprising:
a continuous pulse generating unit that continuously generates a plurality of impulse waveforms at arbitrary time intervals but shorter than a pulse string repetition cycle;
a modulating unit that modulates a continuous pulse generated by the continuous pulse generating unit, using transmission data; and
an output unit that outputs a pulse modulated by the modulating unit,
wherein a pulse interval of a plurality of impulse waveforms generated by the continuous pulse generating unit is set shorter than a pulse width of the plurality of impulse waveforms generated by the continuous pulse generating unit.

2. A transmitting device, comprising:
a continuous pulse generating unit that continuously generates a plurality of impulse waveforms at arbitrary time intervals but shorter than a pulse string repetition cycle;
a modulating unit that modulates a continuous pulse generated by the continuous pulse generating unit, using transmission data; and
an output unit that outputs a pulse modulated by the modulating unit,
said transmitting device, further comprising a frequency converting unit that converts a frequency of a pulse modulated by the modulating unit, wherein
a frequency to be converted by the frequency converting unit is arbitrarily selectable; and
the output unit outputs a modulated pulse after being converted by the frequency converting unit.

3. A transmitting device, comprising:
a continuous pulse generating unit that continuously generates a plurality of impulse waveforms at arbitrary time intervals but shorter than a pulse string repetition cycle;
a modulating unit that modulates a continuous pulse generated by the continuous pulse generating unit, using transmission data; and
an output unit that outputs a pulse modulated by the modulating unit,
said transmitting device, further comprising a frequency converting unit that converts a frequency of a continuous pulse generated by the continuous pulse generating unit, wherein
a frequency to be converted by the frequency converting unit is arbitrarily selectable; and
the modulating unit modulates a continuous pulse after being converted by the frequency converting unit.

4. A receiving device comprising:
a modulated pulse receiving unit that receives a modulated pulse transmitted from a transmitting devices that outputs modulated pulses that are continuous pulses modulated using transmission data, the continuous pulses that are a plurality of impulse waveforms continuously generated at arbitrary time intervals but shorter than a pulse string repetition cycle; and
a demodulating unit that receives transmission data by demodulating a modulated pulse received by the modulated pulse receiving unit,
wherein the demodulating unit demodulates a signal that is a group of a plurality of continuous impulse waveforms pulse-phase modulated, and wherein the receiving device judges a change in phase of a second pulse or later with reference to a first pulse.

5. A receiving device comprising:
a modulated pulse receiving unit that receives a modulated pulse transmitted from a transmitting devices that outputs modulated pulses that are continuous pulses modulated using transmission data, the continuous pulses that are a plurality of impulse waveforms continuously generated at arbitrary time intervals but shorter than a pulse string repetition cycle; and
a demodulating unit that receives transmission data by demodulating a modulated pulse received by the modulated pulse receiving unit,
wherein the demodulating unit demodulates a signal that is a group of a plurality of continuous impulse waveforms pulse-amplitude modulated, and wherein the receiving device judges a size of amplitudes of a second pulse or later with reference to a first pulse.

6. A receiving device comprising:
a modulated pulse receiving unit that receives a modulated pulse transmitted from a transmitting devices that outputs modulated pulses that are continuous pulses modulated using transmission data, the continuous pulses that are a plurality of impulse waveforms continuously generated at arbitrary time intervals but shorter than a pulse string repetition cycle; and
a demodulating unit that receives transmission data by demodulating a modulated pulse received by the modulated pulse receiving unit,
wherein the demodulating unit demodulates a signal that is a group of a plurality of continuous impulse waveforms pulse-position modulated, and wherein the receiving device judges a change in position of a second pulse or later with reference to a first pulse.

7. A transmitting device, comprising:
a continuous pulse generating unit that continuously generates a plurality of impulse waveforms at arbitrary time intervals but shorter than a pulse string repetition cycle;
a modulating unit that modulates a continuous pulse generated by the continuous pulse generating unit, using transmission data; and
an output unit that outputs a pulse modulated by the modulating unit,
said transmitting device further comprising a single pulse transmitting unit that generates a single pulse, pulse-position modulates the single pulse using the transmission data, and outputs the single pulse, wherein continuous pulses generated by the continuous pulse generating unit are a plurality of pulses with different phases continued, and wherein the modulating unit does not modulate the continuous pulses generated by the continuous pulse generating unit but inputs to the output unit.

8. The transmitting device as claimed in claim 7, wherein both a pulse-position modulated signal supplied from the single pulse transmitting unit and the continuous pulses are changed in position as appropriate for same arbitrary time.

9. A receiving device comprising:
a modulated pulse receiving unit that receives a modulated pulse transmitted from a transmitting devices that outputs modulated pulses that are continuous pulses modulated using transmission data, the continuous pulses that are a plurality of impulse waveforms continuously generated at arbitrary time intervals but shorter than a pulse string repetition cycle; and
a demodulating unit that receives transmission data by demodulating a modulated pulse received by the modulated pulse receiving unit,
wherein the continuous pulses are a plurality of pulses with different phases continued, and wherein the receiving device receives a signal transmitted from the transmitting device that outputs the continuous pulses without being modulated and outputs single pulses that have been pulse-position modulated using the transmission data, further comprising:

a two-signal receiving unit that receives a pulse-position modulated signal supplied from the single pulse transmitting unit and the continuous pulses; and a correlation judgment unit that judges information by converting a correlation signal to signals with different phases, positive and negative, according to a pulse position, by multiplying the two signals received by the two-signal receiving unit.

* * * * *